US011182324B2

(12) United States Patent
Kumar et al.

(10) Patent No.: US 11,182,324 B2
(45) Date of Patent: Nov. 23, 2021

(54) UNIFIED FPGA VIEW TO A COMPOSED HOST

(71) Applicant: Intel Corporation, Santa Clara, CA (US)

(72) Inventors: Mohan Kumar, Aloha, OR (US); Murugasamy Nachimuthu, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/905,395

(22) Filed: Jun. 18, 2020

(65) Prior Publication Data
US 2020/0320033 A1 Oct. 8, 2020

Related U.S. Application Data

(62) Division of application No. 15/829,937, filed on Dec. 3, 2017, now abandoned.

(51) Int. Cl.
*G06F 13/40* (2006.01)
*G06F 9/455* (2018.01)
(Continued)

(52) U.S. Cl.
CPC ...... *G06F 13/4022* (2013.01); *G06F 9/45558* (2013.01); *G06F 9/50* (2013.01); *G06F 15/7867* (2013.01); *G06F 2009/45579* (2013.01)

(58) Field of Classification Search
CPC ... H04L 41/04; H04L 49/109; G06F 13/4022; G06F 13/4282; G06F 9/50; G06F 9/45558; G06F 15/7867
See application file for complete search history.

(56) References Cited

U.S. PATENT DOCUMENTS 9,589,598 B1 * 3/2017 Gilley .................... G06F 1/181
2014/0115137 A1   4/2014 Keisam
(Continued)

FOREIGN PATENT DOCUMENTS

EP    3089035 A1    11/2016

OTHER PUBLICATIONS

International Preliminary Report on Patentability for PCT Patent Application No. PCT/US2018/055404, dated Jan. 28, 2019, 7 pages.
(Continued)

*Primary Examiner* — Ernest Unelus
(74) *Attorney, Agent, or Firm* — Compass IP Law PC

(57) ABSTRACT

Mechanisms for Field Programmable Gate Array (FPGA) chaining and unified FPGA views to a composed system hosts and associated methods, apparatus, systems and software A rack is populated with pooled system drawers including pooled compute drawers and pooled FPGA drawers communicatively coupled via input-output (IO) cables. The FPGA resources in the pooled system drawers are enumerated, identifying a location of type of each FPGA and whether it is a chainable FPGA. Intra-drawer chaining mechanisms are identified for the chainable FPGAs in each pooled compute and pooled FPGA drawer. Inter-drawer chaining mechanism are also identified for chaining FPGAs in separate pooled system drawers. The enumerated FPGA and chaining mechanism data is aggregated to generate a unified system view of the FPGA resources and their chaining mechanisms. Based on available compute nodes and FPGAs in the unified system view, new compute nodes are composed using chained FPGAs. The chained FPGAs are exposed to a hypervisor or operating system virtualization layer, or to an operating system hosted by the composed compute node as a virtual monolithic FPGA or multiple local FPGAs.

20 Claims, 17 Drawing Sheets

(51) Int. Cl.
*G06F 15/78* (2006.01)
*G06F 9/50* (2006.01)

(56) References Cited

U.S. PATENT DOCUMENTS

| | | |
|---|---|---|
| 2014/0198653 A1 | 7/2014 | Dalal et al. |
| 2014/0281056 A1 | 9/2014 | Davda et al. |
| 2015/0178243 A1 | 6/2015 | Lowery et al. |
| 2017/0286352 A1 | 10/2017 | Kumar et al. |

OTHER PUBLICATIONS

International Search Report and Written Opinion Received for PCT Patent Application No. PCT/US2018/055404, dated Jan. 28, 2019, 11 pages.

Naif Tarafdar et al., "Enabling Flexible Network FPGA Clusters in a Heterogeneous Cloud Data Center", 2017 ACM/SIGDA International Symposium, Feb. 27, 2017, pp. 3-5; and figure 2.

Andrew Putnam et al: "A reconfigurable fabric for accelerating large-scale datacenter services", ACM SIGARCH Computer Architecture News, ACM Special Interest Group on Computer Architecture, 2 Penn Plaza, Suite 701 New York NY 10121-0701 USA, vol. 42, No. 3, Jun. 14, 2014 (Jun. 14, 2014), pp. 13-24.

Extended European Search Report for Patent Application No. 18882849.5, dated Jul. 23, 2021, 15 pages.

Jordache Anca et al: "High Performance in the Cloud with FPGA Groups", 2016 IEEE/ACM 9TH International Conference On Utility and Cloud Computing (UCC), ACM, Dec. 6, 2016 (Dec. 6, 2016), pp. 1-10.

Kachris Christoforos et al: "The VINEYARD Approach: Versatile, Integrated, Accelerator-Based, Heterogeneous Data Centres", Mar. 13, 2016 (Mar. 13, 2016), ICIAP: International Conference on Image Analysis and Processing, 17TH International Conference, Naples, Italy, Sep. 9-13, 2013. Proceedings; [Lecture Notes in Computer Science; Lect.Notes Computer], Springer, Berlin, Heidelberg, pp. 3-13.

Weerasinghe Jagath et al: "Enabling FPGAs in Hyperscale Data Centers", 2015 IEEE 12TH Intl Conf on Ubiquitous Intelligence and Computing and 2015 IEEE 12TH Intl Conf on Autonomic and Trusted Computing and 2015 IEEE 15TH Intl Conf on Scalable Computing and Communications and its Associated Workshops (UIC-ATC-Scalcom), IE, Aug. 10, 2015 (Aug. 10, 2015), pp. 1078-1086.

* cited by examiner

UNIFIED FPGA VIEW TO A COMPOSED HOST

CROSS-REFERENCE TO RELATED APPLICATION

The present application is a divisional of U.S. patent application Ser. No. 15/829,937, filed on Dec. 3, 2017, entitled "MECHANISMS FOR FPGA CHAINING AND UNIFIED FPGA VIEWS TO COMPOSED SYSTEM HOSTS," which is incorporated by reference in its entirety for all purposes.

BACKGROUND INFORMATION

The availability and use of "Cloud" computing has expanded exponentially in the past few years. Under a conventional computing approach, users run software applications on their own computers and/or access software services hosted by local servers (such as servers run by a business enterprise). In contrast, under cloud computing the compute and storage resources are "in the cloud," meaning they are physically hosted at a remote facility that is accessed via a computer network, such as the Internet. Compute and storage resources hosted by a cloud operator may be accessed via "services," which are commonly referred to as cloud-based services, Web services or simply services.

Cloud-based services are typically hosted by a datacenter that includes the physical arrangement of servers that make up a cloud or a particular portion of a cloud. Data centers commonly employ a physical hierarchy of compute, network and shared storage resources to support scale out of workload requirements. FIG. 1 shows a portion of an exemplary physical hierarchy in a data center 100 including a number L of pods 102, a number M of racks 104, each of which includes slots for a number N of trays 106. Each tray 106, in turn, may include multiple sleds 108. For convenience of explanation, each of pods 102, racks 104, and trays 106 is labeled with a corresponding identifier, such as Pod 1, Rack 2, Tray 1B, etc. Trays may also be referred to as drawers, and sleds may also have various forms, such as modules and nodes. In addition to tray and sled configurations, racks may be provisioned using chassis in which various forms of servers are installed, such as blade server chassis and server blades.

Depicted at the top of each rack 104 is a respective top of rack (ToR) switch 110, which is also labeled by ToR Switch number. Generally, ToR switches 110 are representative of both ToR switches and any other switching facilities that support switching between racks 104. It is conventional practice to refer to these switches as ToR switches whether or not they are physically located at the top of a rack (although they generally are). Alternatively, some implementations include an End of Row (EoR) Switch that are connected to multiple racks instead of TOR switch. As yet another option, some implementations include multiple ToR switches that are configured in a redundant manner, such that is one of the ToR switches fails, another ToR switch is available.

Each Pod 102 further includes a pod switch 112 to which the pod's ToR switches 110 are coupled. In turn, pod switches 112 are coupled to a data center (DC) switch 114. The data center switches may sit at the top of the data center switch hierarchy, or there may be one or more additional levels that are not shown. For ease of explanation, the hierarchies described herein are physical hierarchies that use physical LANs. In practice, it is common to deploy virtual LANs using underlying physical LAN switching facilities.

The cloud-hosted services are generally categorized as Software as a Service (SaaS), Platform as a Service (PaaS), and Infrastructure as a Service (IaaS). SaaS services, also commonly called Web services and cloud application services, enable access to services running on datacenter servers via a network connection and client-side interface, such as a Web browser. Well-known examples of SaaS services include e-mail Web services (e.g., Google Gmail, Microsoft Hotmail, Yahoo mail), Microsoft Office 365, Salesforce.com and Google docs. PaaS, also known as cloud platform services, are used for applications and other development, while providing cloud components to software. Examples of PaaS include Amazon Web Services (AWS) Elastic Beanstalk, Windows Azure, and Google App Engine.

IaaS are services for accessing, monitoring, and managing remote datacenter infrastructures, such as computer (virtualized or bare metal), storage, networking, and networking services (e.g., Firewalls). Instead of purchasing and running their own physical hardware, users can purchases IaaS based on consumption. For example, AWS and Windows Azure respectively offer use of Amazon and Microsoft datacenter resources on a resource allocation/consumption basis. Amazon Elastic Compute Cloud (EC2) is a central part of AWS.

IaaS usage for a given customer typically involves allocation of data center resources. For example, a typical AWS user may request use of one of 24 different EC2 instances, which range from a t2.nano instance with 0.5 Gigabyte (GB) of memory, 1 core/variable cores/compute units and no instance storage to an hs1.8×large with 117 GB of memory, 16/35 cores/compute units and 48000 GB of instance storage. Each allocated EC2 instance consumes certain physical datacenter resources (e.g. compute, memory storage). At the same time, datacenter racks may support a multitude of different configurations. To maximum resource allocation, the IaaS operator needs to track what resources are available in which rack.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
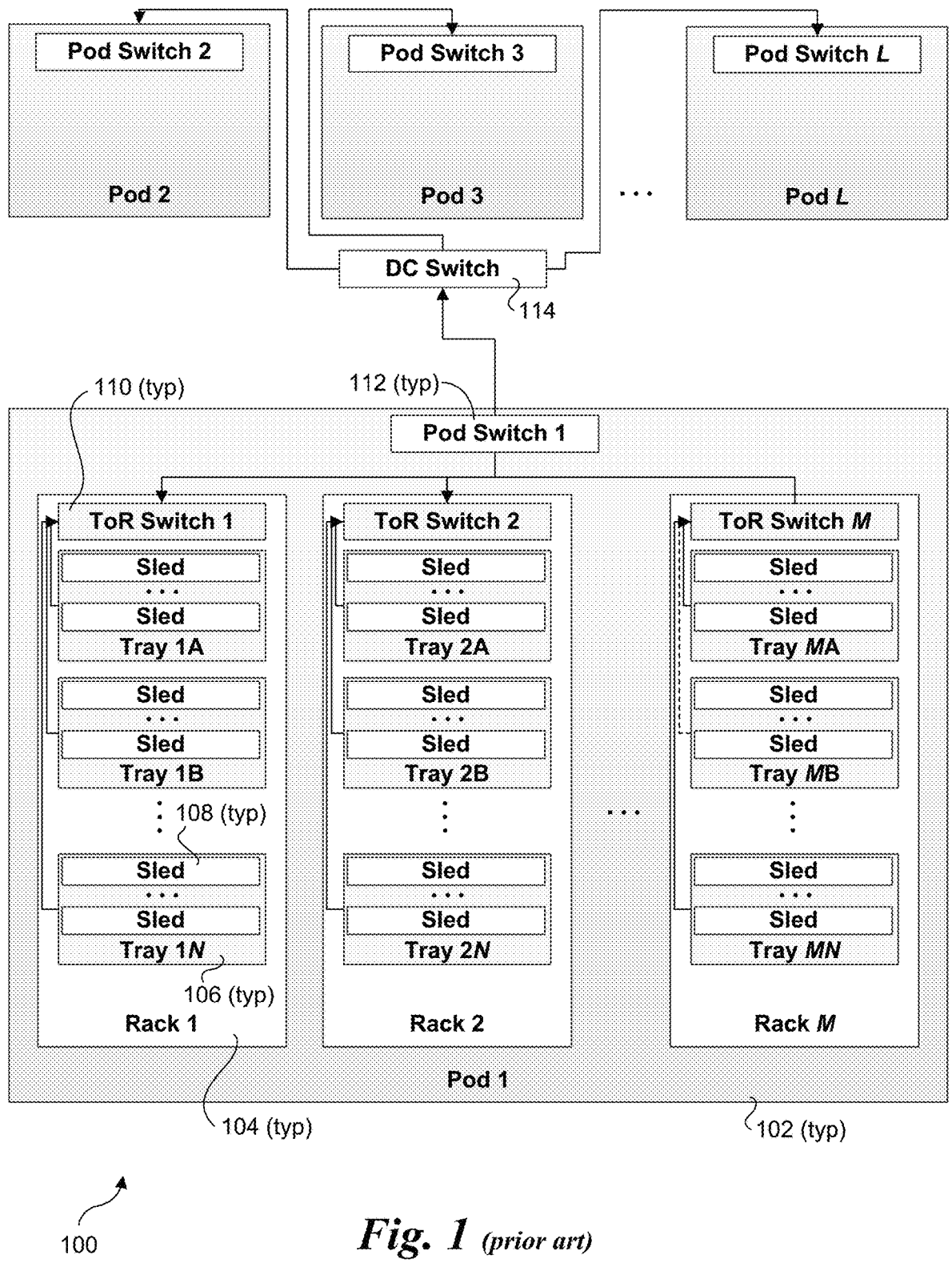
FIG. 1 is a schematic diagram of a conventional physical rack configuration in a data center.

Embodiments of mechanisms for Field Programmable Gate Array (FPGA) chaining and unified FPGA views to a composed system hosts and associated methods, apparatus, systems and software are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Recently, INTEL® Corporation introduced new rack architecture called Rack Scale Design (RSD) (formerly called Rack Scale Architecture). Rack Scale Design is a logical architecture that disaggregates compute, storage, and network resources and introduces the ability to pool these resources for more efficient utilization of assets. It simplifies resource management and provides the ability to dynamically compose resources based on workload-specific demands.

RSD uses compute, fabric, storage, and management modules that work together to enable selectable configuration of a wide range of virtual systems. The design uses four basic pillars, which can be configured based on the user needs. These include 1) a Pod Manager (PODM) for multi-rack management, comprising firmware and software Application Program Interfaces (APIs) that enable resource and policy management and expose the hardware below and the orchestration layer above via a standard interface; 2) a Pooled system of compute, network, and storage resources that may be selectively composed based on workload requirements; 3) Pod-wide storage built on connected storage uses storage algorithms to support a range of usages deployed as a multi-rack resource or storage hardware and compute nodes with local storage; and 4) a configurable network fabric of hardware, interconnect with cables and backplanes, and management software to support a wide range of cost-effective network topologies, including current top-of-rack switch designs and distributed switches in the platforms.

Figure 2:
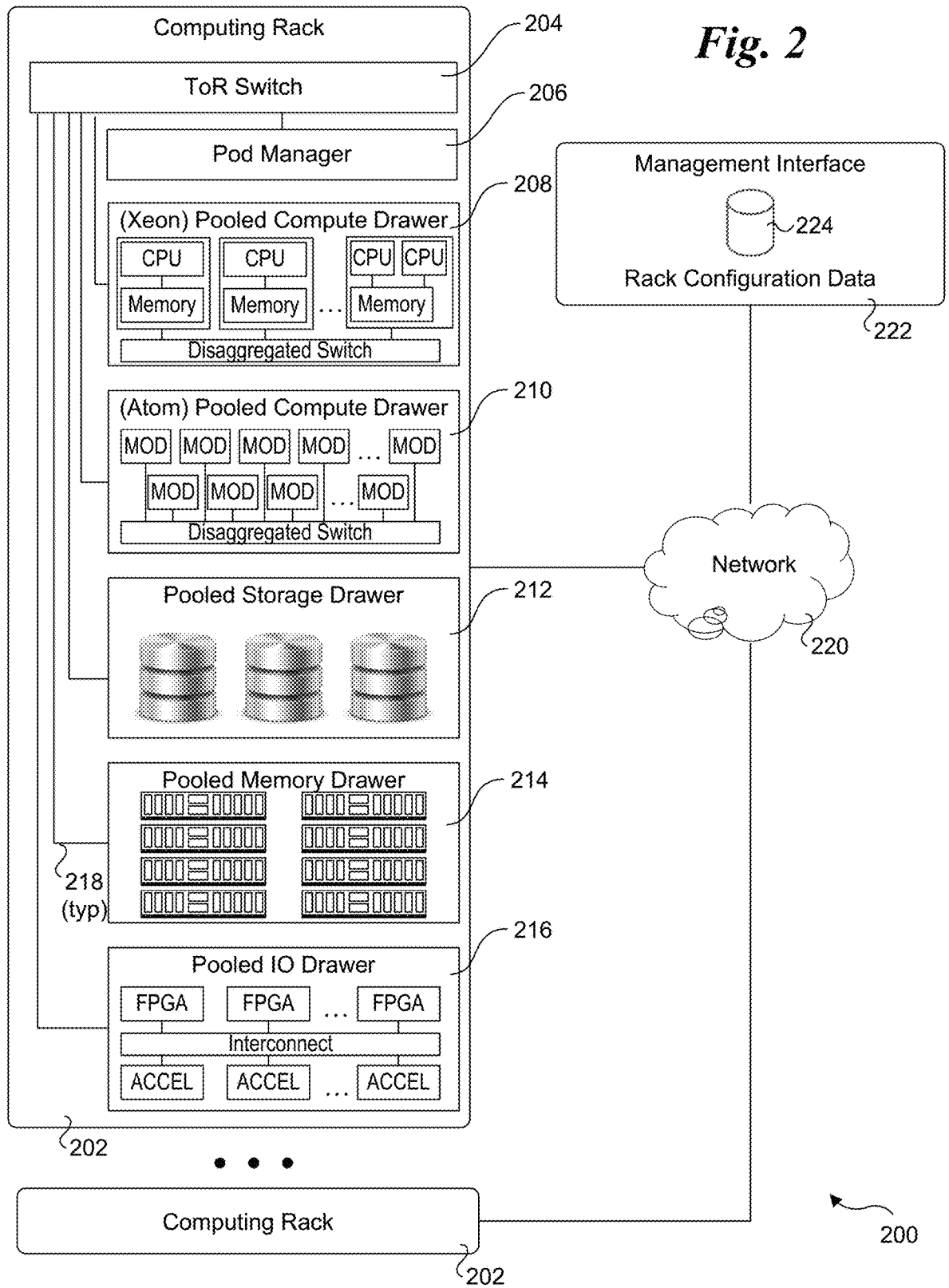
FIG. 2 is a schematic diagram of a Rack Scale Design (RSD) configuration in a data center, according to one embodiment.

An exemplary RSD environment 200 is illustrated in FIG. 2. RSD environment 200 includes multiple computing racks 202, each including a Top of Rack (ToR) switch 204, a pod manager 206, and a plurality of pooled system drawers.

Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an INTEL® XEON® pooled computer drawer 208, and INTEL® ATOM™ pooled compute drawer 210, a pooled storage drawer 212, a pooled memory drawer 214, and an pooled I/O drawer 216. Each of the pooled system drawers is connected to ToR switch 204 via a high-speed link 218, such as a 40 Gigabit/second (Gb/s) or 100 Gb/s Ethernet link or an 100+ Gb/s Silicon Photonics (SiPh) optical link. In one embodiment high-speed link 218 comprises an 800 Gb/s SiPh optical link.

Multiple of the computing racks 200 may be interconnected via their ToR switches 204 (e.g., to a pod-level switch or data center switch), as illustrated by connections to a network 220. In some embodiments, groups of computing racks 202 are managed as separate pods via pod manager(s) 206. In one embodiment, a single pod manager is used to manage all of the racks in the pod. Alternatively, distributed pod managers may be used for pod management operations.

RSD environment 200 further includes a management interface 222 that is used to manage various aspects of the RSD environment. This includes managing rack configuration, with corresponding parameters stored as rack configuration data 224.

Figure 3:
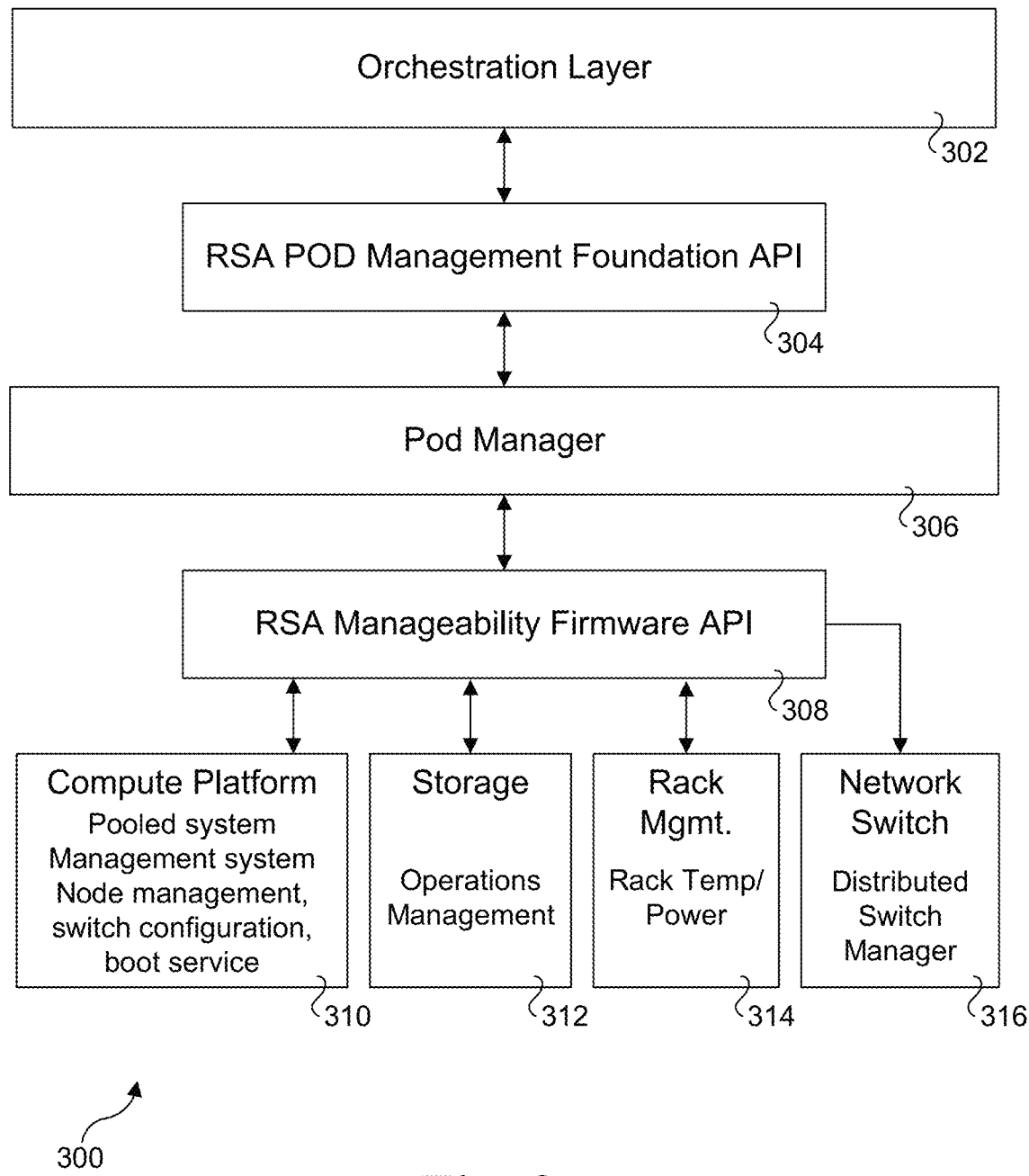
FIG. 3 is a block diagram of an RSD management architecture, according to one embodiment

FIG. 3 shows one embodiment of an RSD management architecture 300. The RSD management architecture includes multiple software and firmware components configured in a layered architecture including an orchestration layer 302, an RSD pod management foundation API (Application Program Interface), a pod manager 306, and an RSD manageability firmware API 308. The bottom layer of RSD management architecture includes a compute platform management component 310, a storage management component 312, a rack management components 314, and a network switch management component 316.

The compute platform management component 310 performs operations associated with compute drawers and includes a pooled system, a management system, node management, switch configuration, and boot service. Storage management component 312 is configured to support operation management of pooled storage drawers. Rack management component 314 is configured to manage rack temperature and power sub-systems. Network switch management component includes a distributed switch manager.

INTEL® Rack Scale Design is designed to change the focus of platform architecture from single servers to converged infrastructure consisting of compute, network and storage, as discussed above and illustrated in FIG. 2. Management of resources is performed at the rack level and pod level. Focus on management of resources at the rack level also requires management of rack level environments such as power and cooling zones as well as providing a rack level root of trust for relative location information. This role is fulfilled by Rack Management Module (RMM), along with a sub-rack unit (the drawer units in RSD terminology) manager called a Pooled System Management Engine (PSME). The management elements of RSD, RMM and PSMEs are connected to a private network that is not accessible external to the rack, as shown in FIG. 4 and discussed below.

Figure 4:
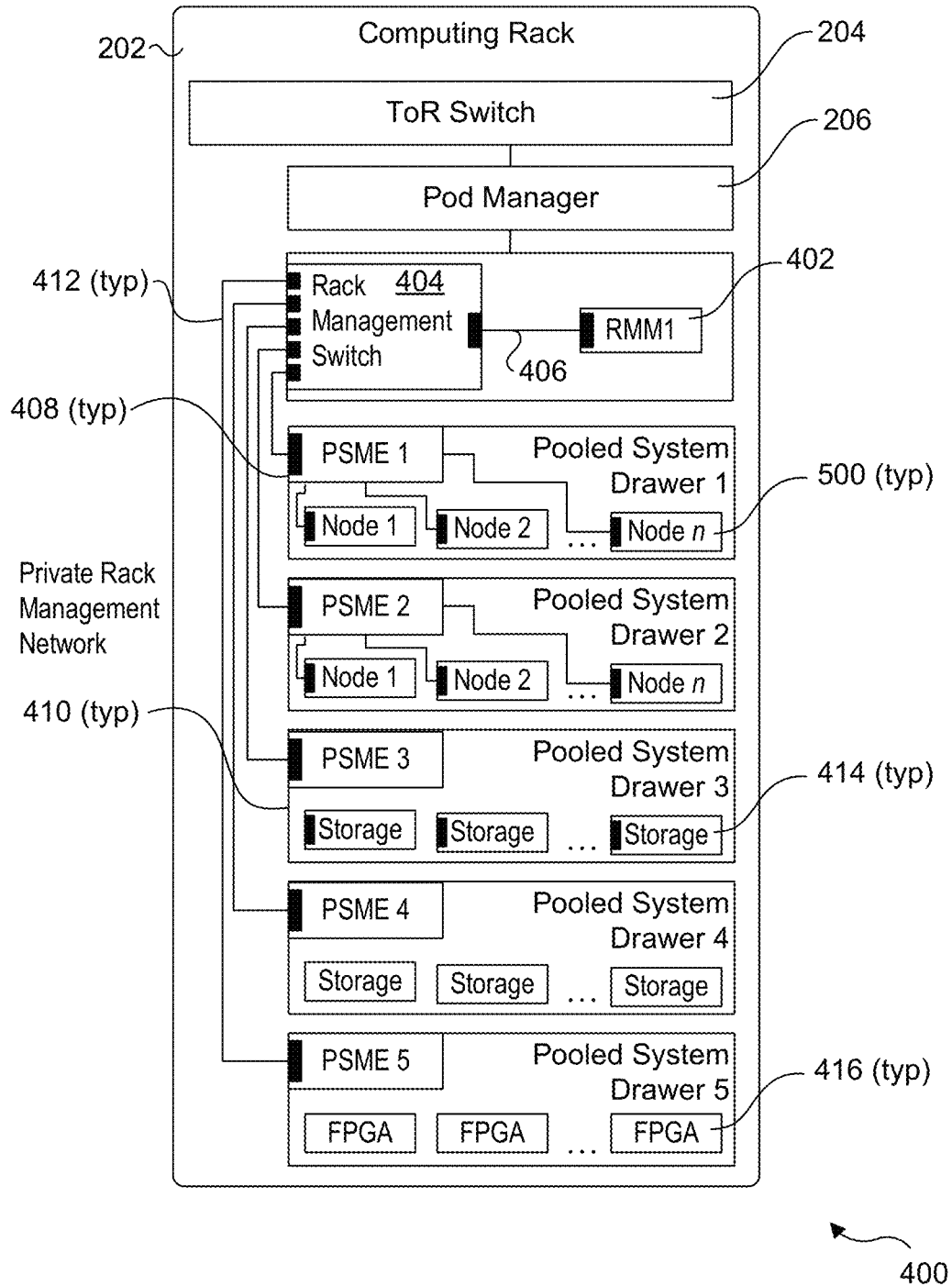
FIG. 4 is a schematic diagram showing further details of an RSD rack implementing Pooled System Management Engines (PSMEs)

FIG. 4 shows one embodiment of a rack configuration 400 employing rack management and configuration components that communicate over a private rack management network. The rack management and configuration components include an RMM 402 coupled in communication with a rack management switch 404 via a link 406. A respective PSME 408 is associated with each of five pooled system drawers 410. Each PSME 408 is connected to rack management switch 404 via a link 412. The rack management switch is also connected to POD Manager 206. In the illustrated embodiment, each of pooled system drawers 1 and 2 includes a plurality of compute nodes 500, while pooled system drawers 3, 4, and 5 respective include a plurality of storage resources 414, a plurality of memory resources 415, and a plurality of IO accelerator resources 416.

In a datacenter environment such as RSD, the data center management software is able to compose various rack resources into a compute instance(s) or compute node that meets user performance requirements. In general, over allocation of resources to meet the performance results in inefficient utilization of the rack resource, leading to higher total cost of ownership (TCO) and lower return on investment (ROI).

In accordance with aspects of the embodiments now described, mechanisms for implementing FPGA chaining and generating unified FPGA views to composed system hosts are provided. In one aspect, FPGA resources comprising FPGA devices and FPGA chips are enumerated at respective levels in a system hierarchy that facilitates sharing of FPGA resources among compute resources. Various FPGA attributes, are enumerated and tabulated, including the number of gates, access bandwidth, and location within the system hierarchy. In one embodiment, this FPGA attributes and associated link/interconnect information is forwarded to the POD manager, which processes the information to build one or more unified FPGA views. Based on information in a unified view, the POD manager is enabled to compose a system that may include "chained" FPGA resources, wherein a given FPGA chain may include FPGA resources that are external to a given compute node, in addition to FPGA resources that are local to the compute node. This enables more efficient utilization of FPGA resources in the data center.

Figure 5:
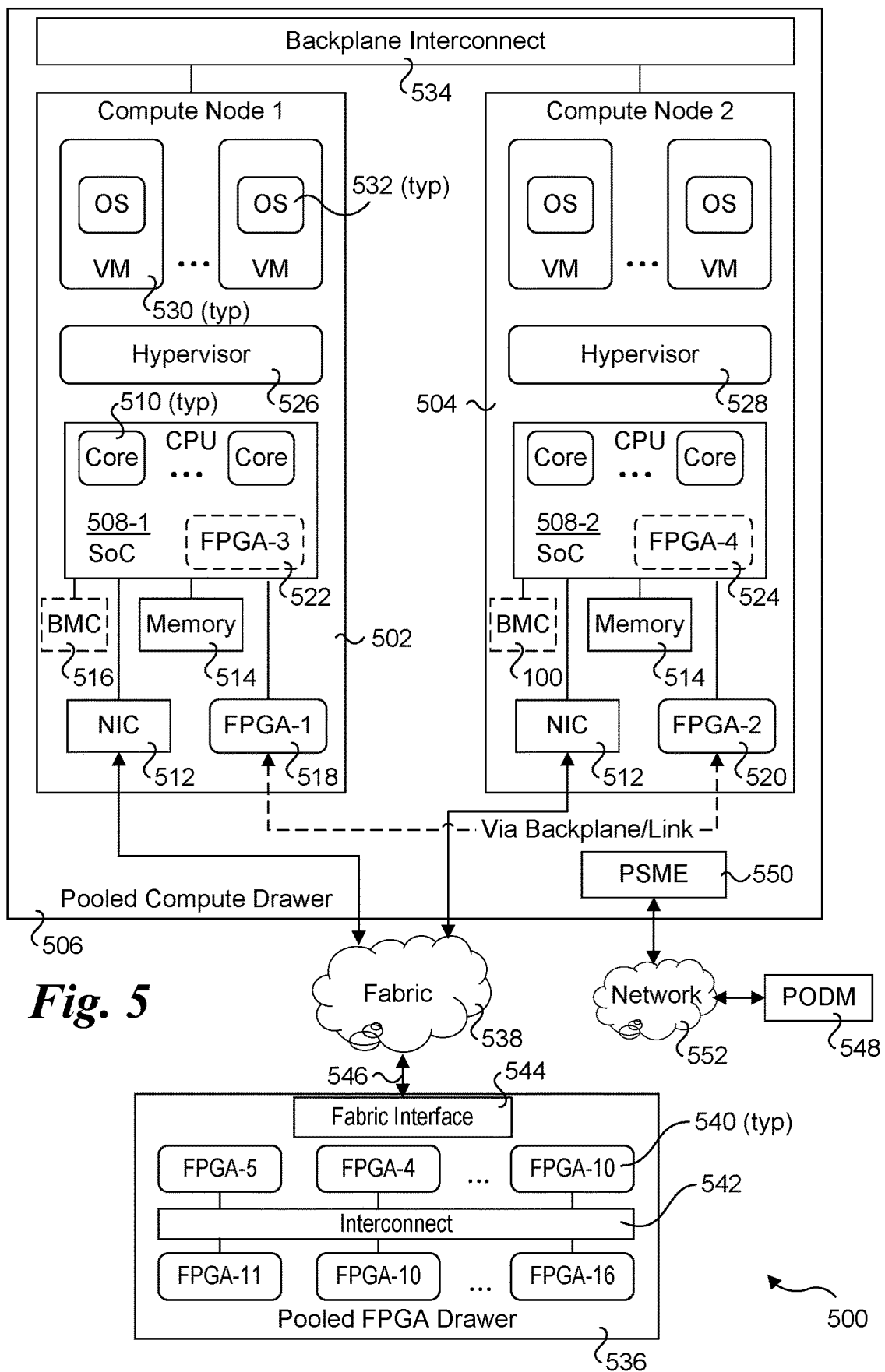
FIG. 5 is a schematic diagram illustrating an exemplary system architecture under which FPGA chaining is facilitated over a fabric to enable an FPGA in a compute node to be chained with an FPGA in a pooled FPGA drawer.

A diagram illustrating an architecture 500 according to one embodiment is shown in FIG. 5. Under architecture 500, each of compute nodes 502 and 504 (also labeled and referred to herein as compute node 1 and compute node 2) are installed in a pooled compute drawer 506 and have a similar configuration. The configuration includes a processor System on a Chip (SoC) 508 (depicted as processor SoC 508-1 and 508-2) including a central processing unit (CPU) with multiple processor cores 510. Processor SoC 508 is further shown coupled to a Network Interface Controller (NIC) 512, and memory 514. Generally, NIC 512 is illustrative of various types of network or fabric adapters, including but not limited to Ethernet network adaptors and host fabric interface (HFI) adapters. Under some configurations, a compute node may include a management or manageability component, such as a baseboard management controller (BMC) 516 or a manageability engine and/or innovation engine (latter two not shown). Each of NIC 512, memory 514, and BMC 516 (if present) is coupled to processor SoC 508 via an appropriate interface (not shown) and interconnect. For example, in one embodiment processor SoC 508 includes a PCIe (Peripheral Component Interconnect Express) root controller and associated PCIe root ports that are coupled to various input-output (IO) peripheral devices, such as a NIC. Meanwhile, memory 514 is coupled to processor SoC 508 via an integrated memory controller (not shown), while BMC 516 is connected to processor SoC 508 via a PCIe interface and PCIe link, another type of IO interface and link, or an out of band (OOB) channel or the like.

Each of compute nodes 502 and 504 further is depicted as including one or more FPGA resources (also illustrated and referred to herein as FPGA devices or simply as FPGAs). In compute node 502, processor SoC 508-1 is coupled to an FPGA 518 (also labeled FPGA-1), while in compute node 504, processor SoC 508-2 is coupled to an FPGA 520 (also labeled FPGA-2). Generally, an FPGA device may be coupled to a processor SoC via an appropriate IO interface and link, including but not limited to a PCIe interface/link, a Universal Path Interconnect (UPI) link, an Intel® Accelerator Link (IAL), an Intel® Omni-Path link, and a Gen-Z link. A processor SoC may also include an embedded FPGA, such as depicted by optional FPGAs 522 and 524 (also respectively labeled FPGA-3 and FPGA-4 in the figures herein).

During runtime operations, various software components are run on each of compute nodes 502 and 504. In the embodiment illustrated in FIG. 5, these include hypervisors 526 and 528, each of which is used to host virtual machines 530 on which a respective operating system 532 is run. Generally, hypervisor 526 may be a Type-1 "bare-metal" or a Type-2 hypervisor. Alternatively, an operating system (OS) virtualization layer may be implemented in place of hypervisor 526 and 528 and used to implement containers in which respective operating systems are run.

Each of compute nodes 502 and 504 is further shown as being coupled to a backplane interconnect 534. Generally, backplane interconnect 534 is illustrative of various types of shared interconnects used to provide power and various data and IO signals to compute nodes in a pooled compute drawer, and although referred to herein as a "backplane" interconnect, may generally be implemented as a mid-plane or base-plane. For example, in some embodiments, each of compute nodes 504 and 506 are server blades or server modules that include an arrayed connector or circuit board edge connector that is mated with a corresponding connector on a backplane, mid-plane or base-plane in the pooled compute drawer.

Figure 7A:
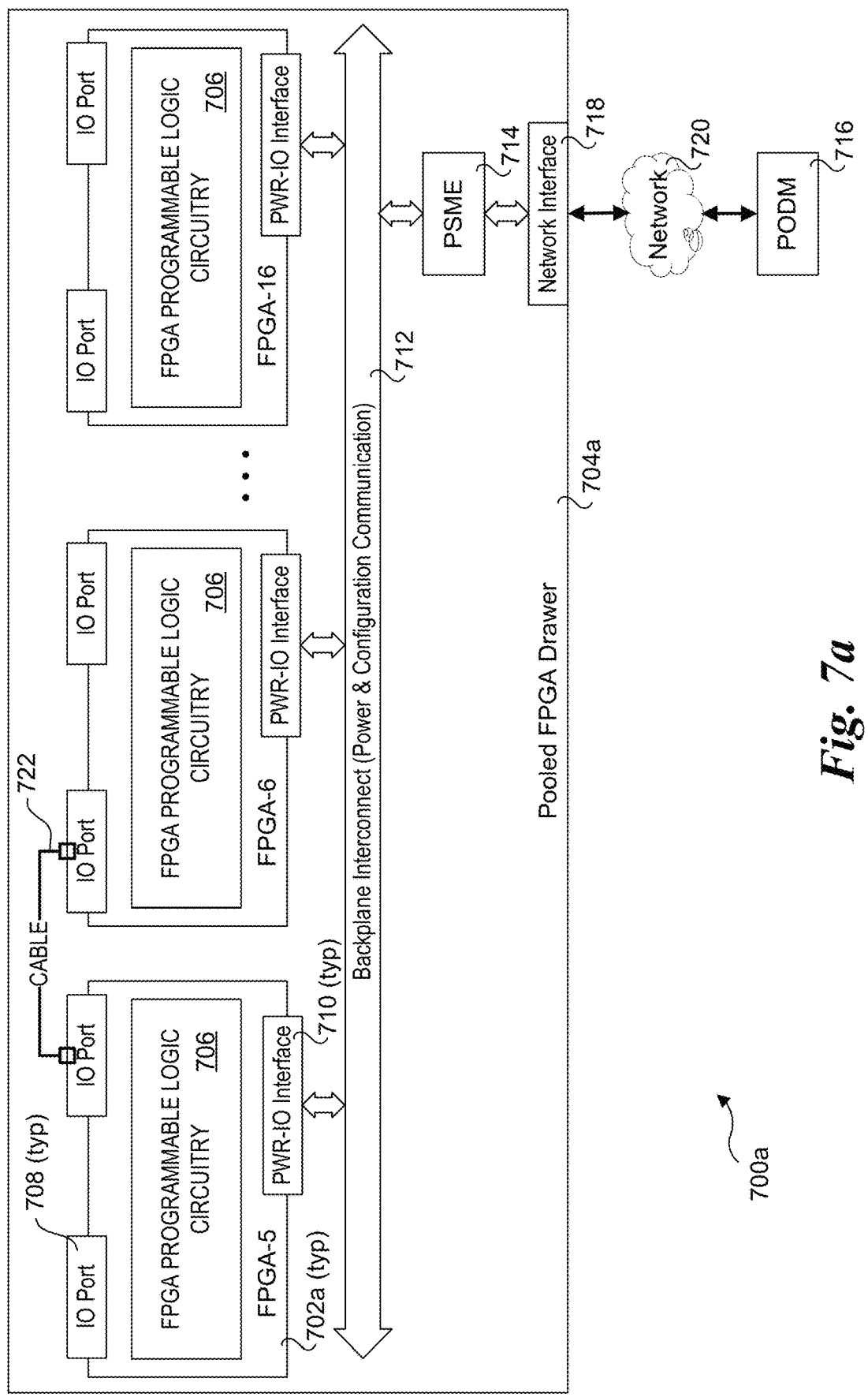
FIG. 7a is a schematic diagram illustrating a first configuration of a pooled FPGA drawer supporting an FPGA chaining mechanisms under which FPGAs are coupled via cables.
Figure 7B:
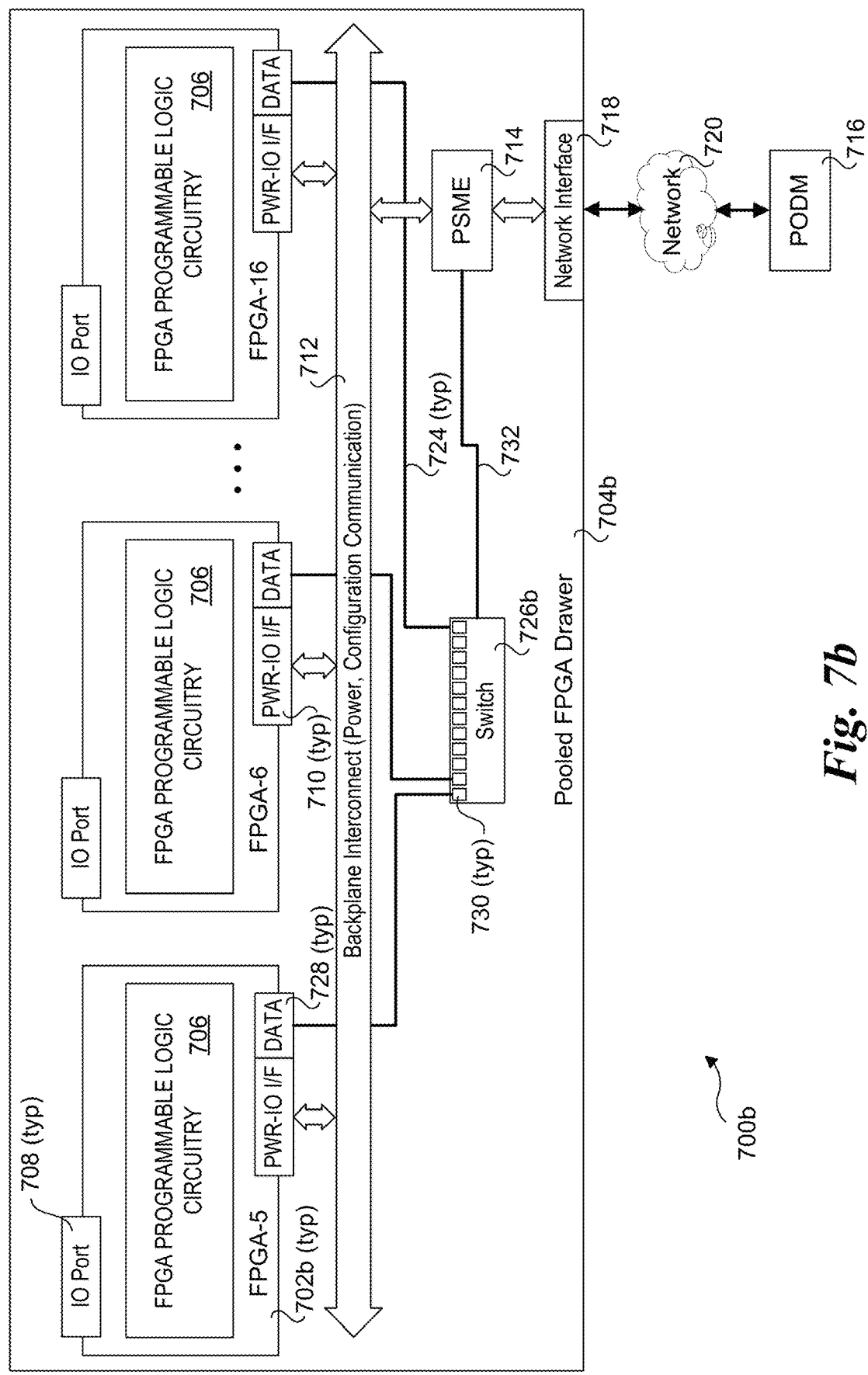
FIG. 7b is a schematic diagram illustrating a second configuration of a pooled FPGA drawer supporting an FPGA chaining mechanisms under which FPGAs are coupled to a backplane that includes wiring for supporting communication between the FPGAs.
Figure 7C:
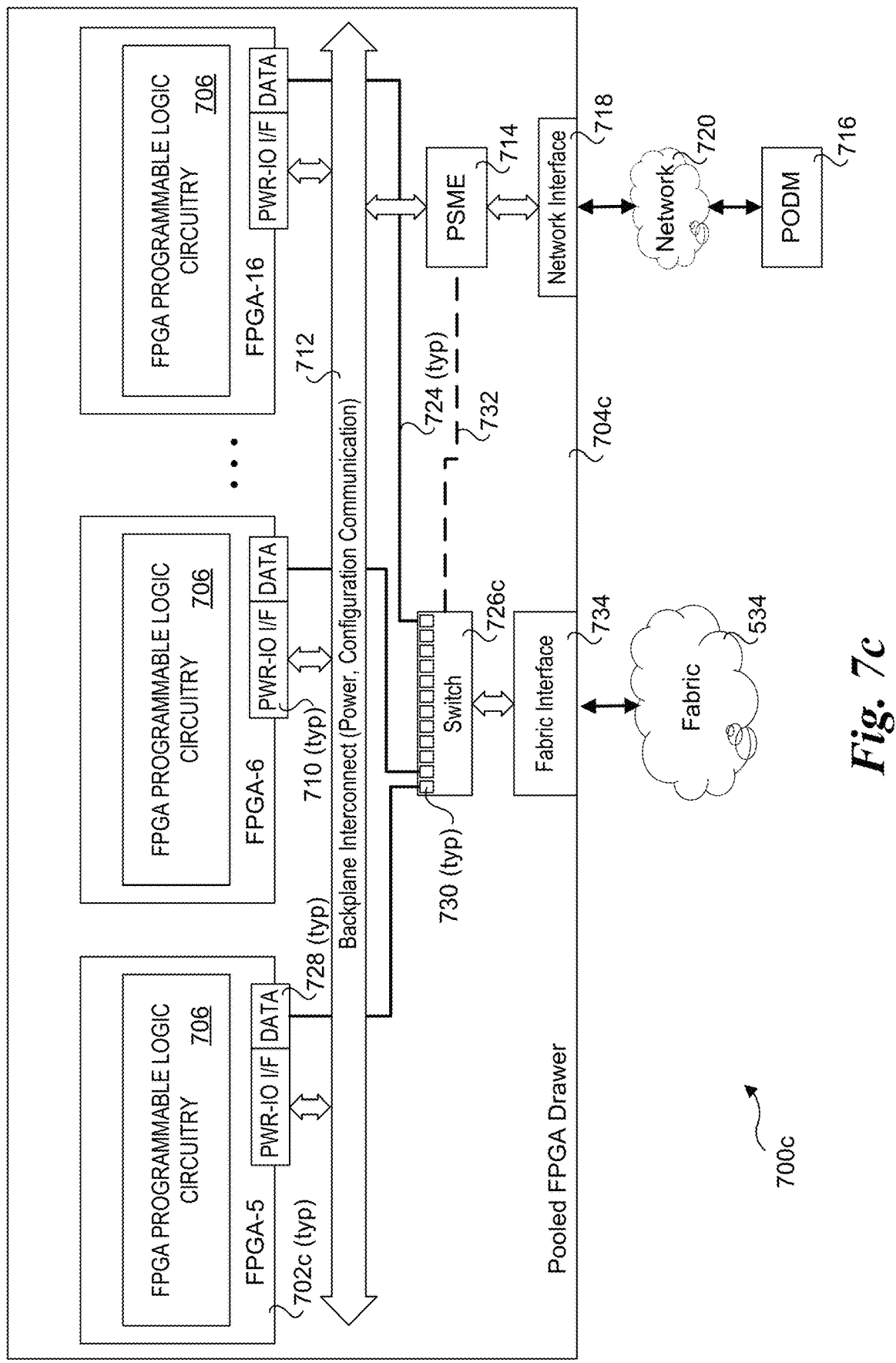
FIG. 7c is a schematic diagram illustrating a third configuration of a pooled FPGA drawer supporting an FPGA chaining mechanisms under which FPGAs are coupled to a backplane that includes wiring for supporting communication between the FPGAs and further including a fabric interface to enable chaining of FPGAs external to the pooled FPGA drawer with FPGAs in the FPGA drawer.

Under the embodiment illustrated in architecture 500, each of compute node 502 and 504 are enabled to access FPGA resources in a pooled FPGA drawer 536 over a fabric 538. Pooled FPGA drawer 536 includes a plurality of FPGAs 540 that are coupled to an interconnect 542. Pooled FPGA drawer 536 also includes a fabric interface 544 coupled to fabric 538 via a link 546. Further details of exemplary embodiments of pooled FPGA drawers are illustrated in FIGS. 7a, 7b, and 7c and described below.

In some embodiments, configuration of compute nodes and their resources are managed by a management entity such as a POD manager that interacts with the PSME on the pooled compute drawer to effect configuration changes and/or read existing configuration data. Accordingly, FIG. 5 further shows a POD manager 548 coupled to a PSME 550 via a network 552. It is further noted that each of the pooled compute drawers shown in FIGS. 6a, 6b, 6c, 10a and 10b and discussed below would likewise include a PSME coupled in communication with a POD manager via a network; however, these components are not shown to avoid clutter.

Figure 6A:
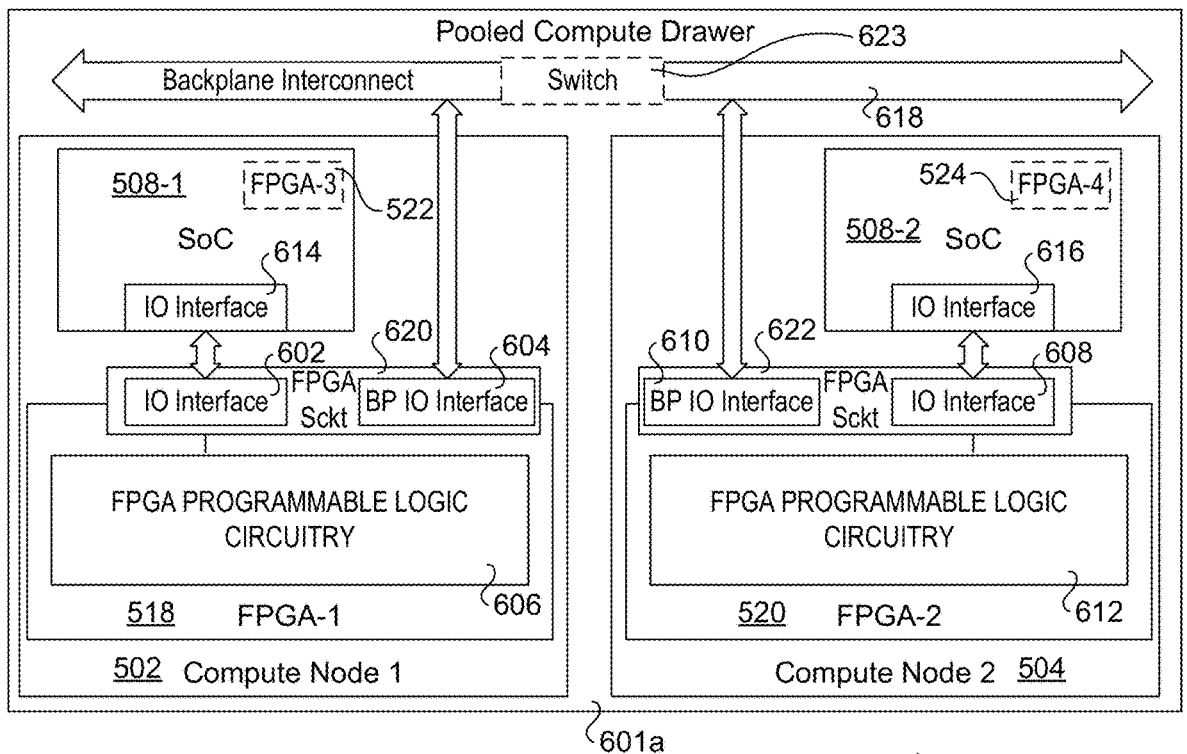
FIG. 6a is a schematic diagram illustrating a first configuration of a pooled compute drawer supporting an FPGA chaining mechanism under which FPGAs that are included in compute nodes are communicatively-coupled to a backplane in the pooled compute drawer.
Figure 6B:
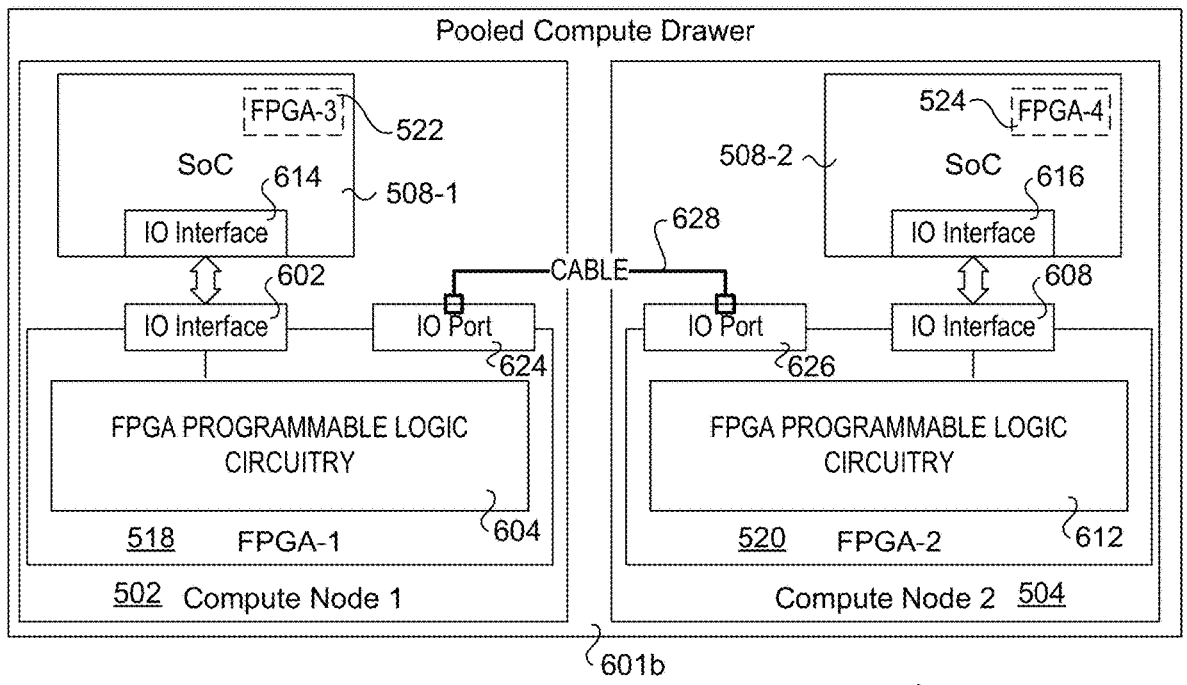
FIG. 6b is a schematic diagram illustrating a second configuration of a pooled compute drawer supporting an FPGA chaining mechanism under which FPGAs that are included in compute nodes are communicatively-coupled via a cable.
Figure 6C:
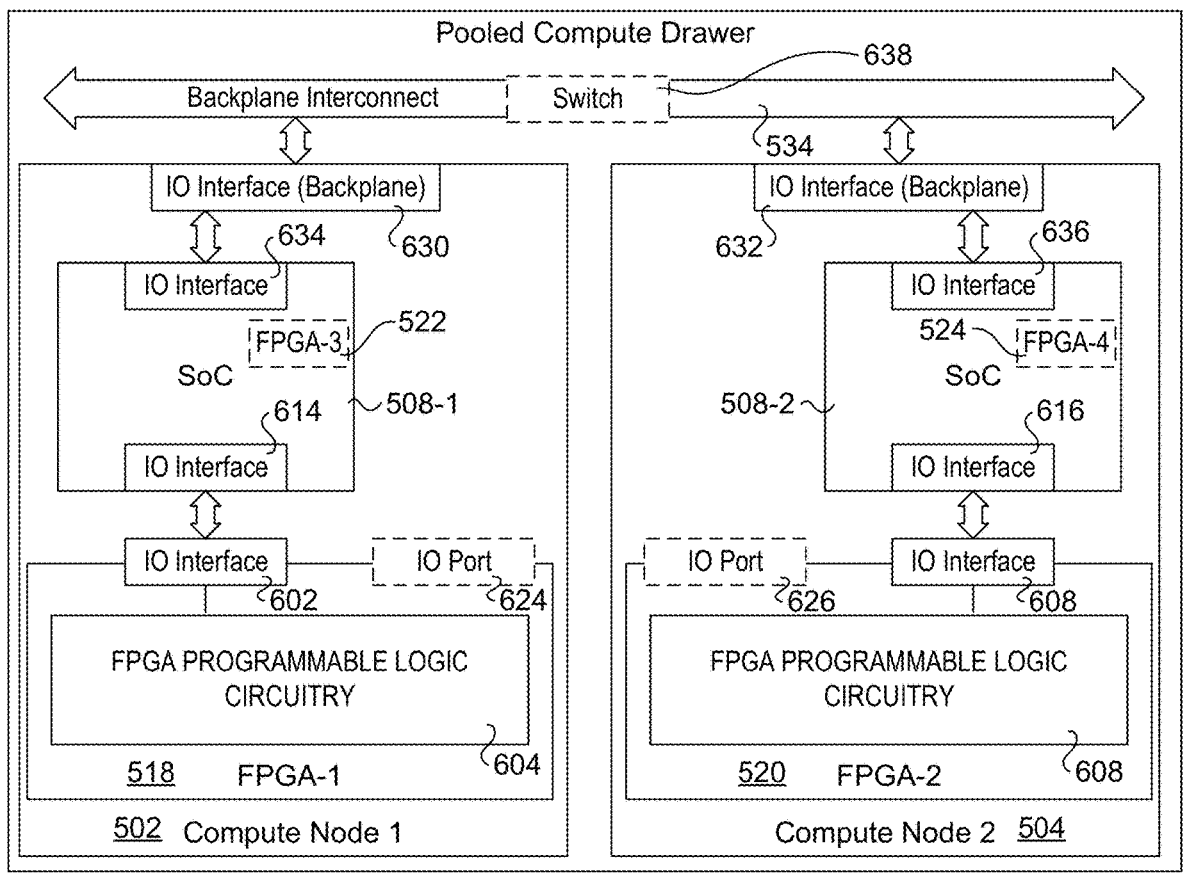
FIG. 6c is a schematic diagram illustrating a third configuration of a pooled compute drawer supporting an FPGA chaining mechanism under which compute nodes including respective FPGAs are coupled to a backplane in the pooled compute drawer.

Generally, FPGAs can be chained (i.e., linked in communication) using both communication pathways within a pooled compute drawer and using communication pathways that span separate pooled system drawers. Examples of FPGA chaining within pooled compute drawers are shown in FIGS. 6a, 6b, and 6c. In each of these Figures, some details of the compute nodes are left out to focus on the communication pathways between the FPGAs; those having skill in the art will recognize each of the compute nodes would include further components that are not illustrated for clarity.

In the configuration 600a shown in FIG. 6a, each of compute nodes 502 and 504 are installed in a pooled compute drawer 601a. FPGA 518 is further depicted as including an IO interface 602, a backplane IO interface 604, and FPGA programmable logic circuitry 606 while FPGA 520 is further depicted as including an IO interface 608, a backplane IO interface 610, and FPGA programmable logic circuitry 612. IO interface 602 of FPGA 518 is coupled to an IO interface 614 on processor SoC 508-1. Similarly, IO interface 602 of FPGA 520 is coupled to an IO interface 616 on processor SoC 508-2. Meanwhile, each of backplane IO interfaces 604 and 610 are coupled to a backplane interconnect 618. In the embodiment of FIG. 6a, backplane interconnect 618 is employed for coupling signals between FPGA 518 and FPGA 520; however, the signal paths used for backplane interconnect 618 may be part of a larger backplane in a pooled compute drawer, such as part of backplane interconnect 534 depicted in FIG. 5.

In one embodiment, the processor SoC in a compute node is mounted to a main board, either via a direct mount (e.g., flip-chip packaging) or installed in a socket mounted to the main board. Each of the FPGAs is a chip or a package that is installed in an FPGA socket that is also mounted to the main board, as depicted by FPGA sockets 620 and 622. Optionally, an FPGA chip or package may likewise be coupled to the main board via a direct mount, or may be mounted on a daughterboard or the like or otherwise included as part of a multi-chip package. As yet another option, FPGAs 518 and 520 may be cards that are inserted into slots mounted to the main board (not shown) or daughterboard or the like. The main board includes routing that couples the signals corresponding to IO interfaces 602 and 608 to the IO interfaces 614 and 616 on processor SoCs 508-1 and 508-2. The main board also includes wiring that couples the signals for backplane IO interfaces 604 and 610 to backplane interconnect 618, as depicted by signal paths 619 and 621. The use of backplane IO interfaces 604 and 610 in combination with corresponding wiring in backplane interconnect 618 enables FPGA 518 and FPGA 520 to be chained. Under this embodiment, FPGA 518 and FPGA 520 are enabled to communicate directly over backplane interconnect 618 without the assistance of either processor SoC 508-1 or 508-2.

As further shown in FIG. 6a, backplane interconnect 618 may further include a switch 623. Generally, switch 623 may comprise a stand-alone component (including switch ports, not shown), or circuitry to effect switching operations. For example, in one embodiment switch 623 is a cross-bar switch. Optionally, multiplexers and demultiplexers may be implemented at ingress and egress interfaces to the backplane interconnect (not shown).

The use of a switch or circuitry to effect equivalent operations enables more flexible FPGA chaining options. For example, suppose there are four compute nodes 1-4 in a pooled compute drawer, each having its own FPGA. Through the use of a switch, a given FPGA may be coupled to any of the other FPGAs. For example, a first FPGA in compute node 1 could be coupled to the FPGA in any of compute node 2, 3, or 4.

A second embodiment that supports direct connection between FPGAs installed in a pooled compute drawer 601b is depicted by configuration 600b in FIG. 6b. In FIGS. 6a and 6b, like numbered components perform similar operations; thus, the focus is on the differences of the two configurations. As illustrated, the backplane IO interfaces 604 and 610 are replaced with IO ports 624 and 626, and backplane interconnect 618 has been removed. (It is noted that pooled compute drawer 601b may still have a backplane interconnect, just not one to which the FPGAs are coupled.) A cable 628 is coupled between IO ports 624 and 626, enabling FPGA 518 to directly communicate with FPGA 520, which further enables FPGA 518 and FPGA 520 to be chained.

As before, FPGAs 518 and 520 may be mounted to a main board or daughterboard, mounted in a socket coupled to a main board or daughterboard, or be implemented on a card that is installed in an IO slot. In alternative embodiments, cable 628 may be internal to (routed within) a pooled compute drawer, or may be an external cable that is coupled to external ports on the pooled compute drawer (or external ports on the compute nodes). For embodiments that include external ports, applicable wiring is provided by the circuit board(s) via which signals from the FPGA are coupled to a corresponding cable port. Generally, the cables will be configured in accordance with a corresponding protocol, such as an Ethernet protocol (and corresponding Ethernet cables). Other types of communication protocols and cables may be used, such as but not limited to PCIe (existing and future generations), Omni-path, and Gen-Z.

Configuration 600c in FIG. 6c shows another mechanism for coupling FPGAs within a compute drawer. Under configuration 600c, signals are routed over the primary backplane interconnect for the pooled compute drawer, as depicted by backplane interconnect 534. Each of compute nodes 502 and 504 includes a backplane connector with a corresponding IO interface, as depicted by backplane IO interfaces 630 and 632. In turn, these backplane IO interfaces are respectively coupled to IO interfaces 634 and 636 in processor SoCs 508-1 and 508-2. Backplane 534 further includes an optional switch 638 (or circuitry to effect equivalent functionality).

The embodiments depicted in FIGS. 6a and 6c both route signals between FPGAs 518 and 520 over backplane circuitry. Under configuration 600a of FIG. 6a, the connection between an FPGA and the backplane is direct, while under configuration 600c of FIG. 6c the routing is via an IO interconnect structure involving traversal of multiple IO interfaces. In one embodiment, IO interfaces 602 and 608 are PCIe interfaces, while IO interfaces 614 and 616 and backplane IO interfaces 630 and 632 are PCIe root ports. In one embodiment, the PCIe interconnect structure is configured to support DMA (direct memory access) operations that support transfer of data between FPGA 518 and 520 without using any of the processor cores on processor SoCs 508-1 and 508-2.

Multiple schemes are also supported for linking (chaining) FPGAs within pooled FPGA drawers, including embodiments shown in FIGS. 7a, 7b, and 7c. Under configuration 700a of FIG. 7a, a plurality of FPGAs 702a are installed in a pooled FPGA drawer 704a. Each FPGA 702 includes FPGA programmable logic circuitry 706 and a pair of IO ports 708. Each FPGA 702 further includes a power (PWR)-IO interface 710 coupled to a backplane interconnect 712. As above, the term "backplane" is used generically here to cover other configurations, including mid-plane and baseplane configurations. Moreover, under alternative configurations the FPGAs illustrated in FIGS. 7a, 7b, and 7c may comprise FPGA cards or modules having a connecter that is installed in a mating slot/connector in pooled FPGA drawer that is coupled to backplane interconnect 712.

In the embodiment illustrated in FIG. 7a, backplane interconnect 712 is depicted as providing power and configuration communication. The configuration communication portion of backplane interconnect 712 includes circuitry and wiring for facilitating configuration of the FPGAs, including downloading FPGA bitstreams to configure FPGA programmable logic circuitry in each FPGA. In the illustrated embodiment, FPGA configuration is implemented via use of a PSME 714 that communicates with a PODM 716 via a network interface 718 and network 720. In one embodiment, network 720 is a private network that is separate and apart from the network fabric implemented in some of the embodiments herein (such as in FIGS. 5, 5a and 7c).

The IO ports 708 for the FPGAs 702a are used to communicate with external FPGA consumers (see an example of this in FIG. 10a below) and used for chaining between FPGAs 702 within pooled FPGA drawer 704a. In one embodiment, IO ports 708 are mounted on FPGA cards or modules, and are configured to receive cable connectors to enable cables to be coupled both to an external FPGA consumer and cables between FPGA 702a, as depicted by a cable 722. In an alternative embodiment (not shown), an FPGA PWR-IO interface includes pins or traces to carry signals to a physical cable port that is mounted to the pooled FPGA drawer. This would generally include wiring in a circuit board or the like between the connector half on the main board or backplane of the pooled FPGA drawer and the physical cable port. As another alternative configuration, FPGAs 702a may have more than two IO ports. In addition, a portion of the IO ports on an FPGA may be used for internal cabling, wherein the IO ports are not exposed to receive cables external to the pooled FPGA drawer. In one embodiment, the IO Port are coupled to multiplexer circuitry (not shown) that enables signals to be routed to selected circuitry and/or interfaces on the FPGAs.

In configuration 700b of FIG. 7b, a plurality of FPGAs 702b are installed in a pooled FPGA drawer 704b, wherein communication between FPGAs 702b is facilitated via wiring 724 and a switch 726b rather than coupling FPGAs using cables. In addition to a power-IO interface 710, each of FPGAs 702b includes a data interface 728. Each data interface 728 is connected to a respective switch port 730 in switch 726b via wiring 724. As will be recognized by those skilled in the art, power-IO interface and data interface may be combined into a single interface and all or a portion of wiring 724 may be part of backplane interconnect 712.

As further illustrated in FIG. 7b, PSME 714 is coupled to switch 726b via a link 732. This enables switch 726 to be dynamically reconfigured by PODM 716 (or some other management entity connected to network 720). In one embodiment, switch 726b employs switchable crossbar circuitry that enables data interfaces 728 to be coupled directly without requiring buffers (or otherwise requiring minimal buffering). Optionally, switch 726b may employ input and output buffers that are similar to those used in network switches or the like.

As with configuration 700a of FIG. 7a, IO ports 708 are configured to support commutation with FPGA consumers external to Pooled FPGA drawer 704 that are coupled to an IO port 708 via a cable. Also, as above, IO ports 708 may be located on an FPGA card or module, or may be connected to a physical cable port mounted to pooled FPGA drawer 704b.

Configuration 700c of FIG. 7c includes a plurality of FPGAs 702c installed in a pooled FPGA drawer 704c. FPGAs 702c are similar to FPGAs 702b, except they do not include an IO port 708. Rather, under configuration 700c, data communication between the FPGAs 702c and FPGA consumers external to pooled compute drawer 704c is facilitated via fabric 534, a fabric interface 734, and a switch 726c. Under optional configurations, PSME 714 may be used to configure switch 726c or switch 726c may be configured via control messages sent over fabric 534.

Each of configurations 700a, 700b, and 700c have their strengths and weaknesses. For example, the use of direct cable connection for external FPGA consumers in configurations 700a and 700b provide higher communication bandwidth than data transmissions over a shared fabric (when the bandwidth of the fabric links and cabled links are similar). Meanwhile, the use of the shared fabric and configurable switching enables dynamic configuration of FPGA chains without requiring any physical connections of cables.

Figure 8:
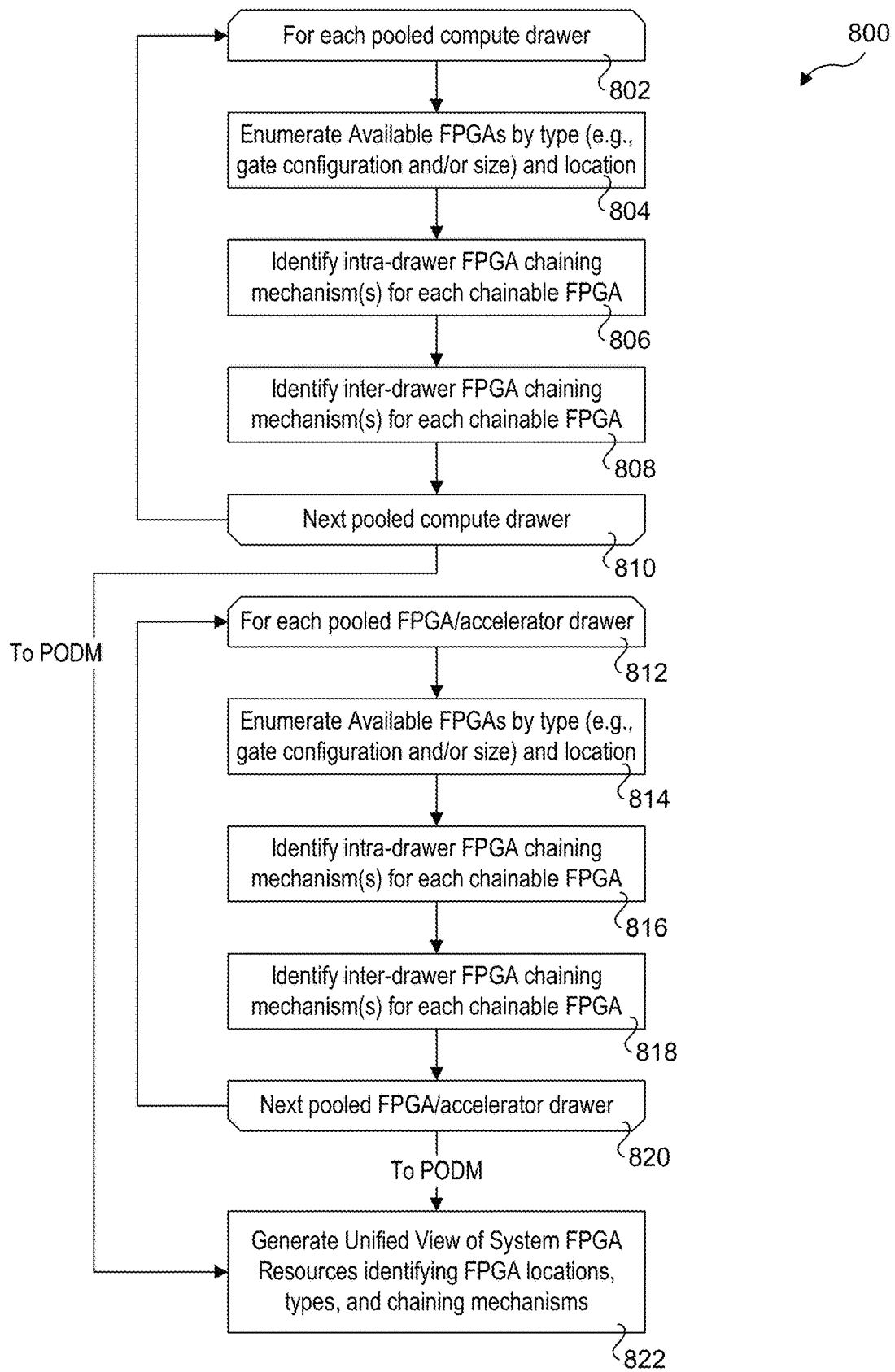
FIG. 8 is a flowchart illustrating operations for enumerating FPGA resources in a system and associated FPGA chaining mechanisms and generating a unified view of the FPGA resources for the system.

FIG. 8 shows a flowchart 800 illustrating operations for enumerating FPGA resources and generating a unified view of the system FPGA resources, according to one embodiment. As depicted by start and end loop blocks 802 and 810, the operations of blocks 804, 806, and 808 are performed in a loop-wise manner for each pooled compute drawer. Similarly, as depicted by start and end loop blocks 812 and 820, the operations of blocks 814, 816, and 818 are performed in a loop-wise manner for each pooled FPGA drawer.

In a block 804, the available FPGAs in each compute drawer are enumerated by type and location and/or other attributes relating to capabilities of each FPGA (such as size). For example, a compute drawer may have multiple slots or the like in which compute nodes are installed; each node will have a slot number and each pooled compute drawer will have a drawer number. For a given compute node, zero of more available FPGAs will be enumerated and uniquely identified. Each FPGA will also be associated with an FPGA type, wherein each FPGA type will be associated with capabilities for the FPGA type, such as number of programmable gates, particular configurations of the gates, such as number of tiles and/or gates per tile, etc. Optionally, attributes relating to the capabilities may be explicitly provided rather than an FPGA type. Another aspect of the FPGA type may relate to its connectivity to the processor SoC for the compute node, such as whether it is embedded in the processor SoC, and, for non-embedded FPGAs under which the FPGA is coupled to the processor SoC, a type of IO link used and/or the capabilities of the IO link (e.g., bandwidth and/or other link attributes or parameters).

In a block 806, one or more intra-drawer FPGA chaining mechanisms is/are identified for each chainable FPGA. For example, configuration 600a of FIG. 6a employs a chaining mechanism comprising a backplane IO interface, configuration 600b of FIG. 6b employs chaining mechanism comprising a cable coupled between IO ports, and configuration 600c of FIG. 6c employs a multiple-level hierarchical IO interconnect chaining mechanism. Each of the foregoing applies for chaining between FPGA 518 and FPGA 520. In addition, if the processor SoC includes an embedded FPGA, there will be a first chaining mechanism between the embedded FPGA and an FPGA coupled to the processor SoC in the same computer node (if any), while there will be a second chaining mechanism from the embedded FPGA to an FPGA on another compute node within the same pooled compute drawer.

In a block 808, the inter-drawer chaining mechanisms available for each chainable FPGA are identified, wherein the chaining mechanisms facilitate chaining of an FPGA in the pooled compute drawer to another FPGA in a separate pooled system drawer comprising either a pooled FPGA drawer, or another pooled compute drawer. Non-limiting examples of inter-drawer chaining mechanism are described below with reference to FIGS. 10a and 10b.

Operations 814, 816, and 818 are analogous to operations 804, 806, and 808, except they are performed for FPGAs in a pooled FPGA drawer rather than a pooled compute drawer. In block 814, the available FPGAs are enumerated by type and location (and/or attributes relating to capabilities). The types are similar to that discussed above, while in one embodiment the location of an FPGA is a slot in the pooled FPGA drawer. Optionally, in some embodiments multiple FPGAs may be installed on the same card or an FPGA module, and thus enumeration will include identity of the card slot or module slot plus an identity of the FPGA on that card or module. For example, a card or module might include four FPGAs numbered 1, 2, 3 and 4 that are installed in the third slot of a pooled FPGA drawer; thus the FPGAs are identified as 3-1, 3-2, 3-3, and 3-4.

In block 816 the intra-drawer FPGA chaining mechanisms for each chainable FPGA are identified. Non-limiting examples of three FPGA chaining mechanisms are illustrated in configurations 700a, 700b, and 700c of FIGS. 7a, 7b, and 7c, as discussed above. These include cabled IO ports and shared backplane switching schemes. In block 818 the inter-drawer chaining mechanisms for each chainable FPGA are identified. In the case of a pooled FPGA drawer that is accessed over a fabric, the may be a single entry that applies to all of the FGPAs in the pooled FPGA drawer. Optionally, there might be one or more entries for each chainable FPGA.

In one embodiment, the FPGA configuration information for a pooled compute drawer and a pooled FPGA drawer is aggregated by the PSME in the drawer and forwarded to the POD Manager for the rack. Generally, the operations depicted in the upper and lower loops may be performed in parallel. Moreover, the information may be updated when different compute nodes and/or FPGAs are installed in a pooled compute drawer during ongoing operations. For example, under some embodiments the pooled compute drawers and/or pooled FPGA drawers support "hot-swap" operations under which a board or module may be swapped out for another board or module or a board or module may be installed in a previously empty slot. In response, the applicable PSME will update its FPGA configuration information and forwarded the updated FPGA to the POD Manager.

In a block 822, the POD Manager generates a unified view of the system FPGA resources, identifying the FPGA locations, types/capability attributes, and chaining mechanisms for each FPGA. Data from which the unified view may be derived may be stored in one of several well-known schemes, such as in one or more lists, tables, maps, or similar data structures.

Figure 9:
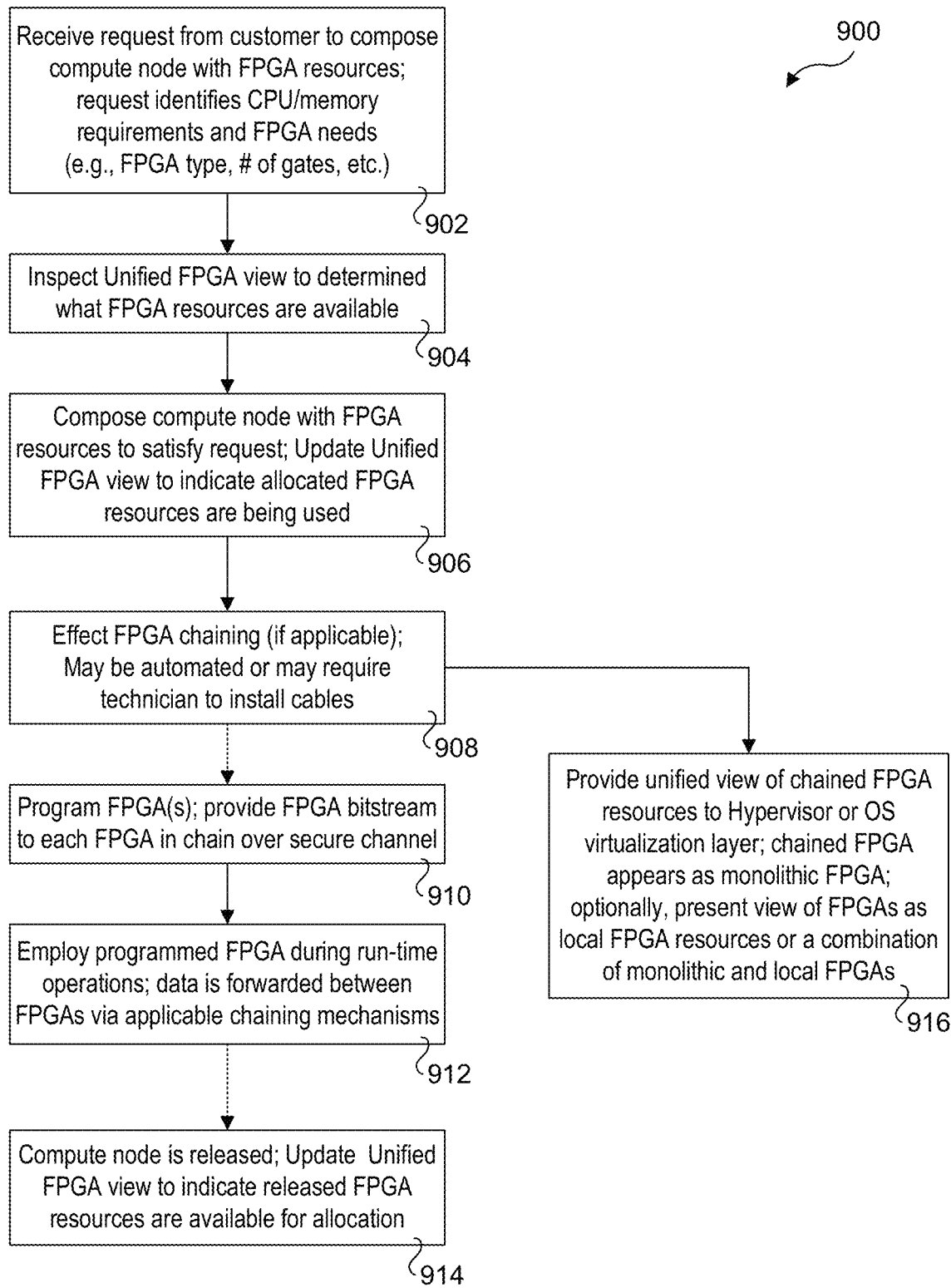
FIG. 9 is a flowchart illustrating operations for composing a compute node that includes chained FPGAs and exposing a unified view of the chained FPGAs to a hypervisor or operating system virtualization layer hosted by the compute node.

FIG. 9 shows a flowchart 900 illustrating operations performed for composing compute nodes with FPGA resources, according to one embodiment. In a block 902, a request is received from a customer to compose a compute node with FPGA resources. The request may identify compute, memory, and FPGA resources, such as CPU type, amount of memory, and FPGA type, number of gates, or other indicia, attributes, or parameters relating to the compute, memory, and FPGA resources. In one embodiment, the request is received by the POD Manager (or otherwise forwarded to the POD Manager). For example, under the embodiment of FIG. 2, the request may be received via a Web service or the like which communicates with management interface 222. Generally, the customer may be an external or internal customer. An example of an external customer would be analogous to an Amazon AWS or EC2 customer that enters a PaaS or IaaS request via a Web portal or the like. An internal customer may relate to an enterprise user, wherein the compute and FPGA resources are deployed to service PaaS and/or IaaS requests from the enterprise. Generally, the customer may be a human or an automated entity.

In a block 904, the unified system FPGA view is inspected to determine what available resources are available. For example, during on-going operations, various compute nodes will be composed, used for a period of time, and then released. Thus, at any point in time, some of the FPGA resources may be currently allocated to compute nodes, while other FPGA resources are idled and available for allocation.

In a block 906, a compute node with FPGA resources is composed to satisfy the request. This may or may not involve any FPGA chaining, depending on what the requirements are. In one embodiment, local FPGA resources are favored over remote FPGA resources; thus, the FPGA resources that are local (i.e., first on the same compute node (e.g., server or module), and second within the same pooled compute drawer) are favored over FPGA resources in pooled FPGA drawers or in separate pooled compute drawers. However, in some deployments it may be common for all or multiple compute nodes within the same pooled compute drawer to consume its own FPGA resources, resulting in the only available chainable FPGA resources being FPGAs in pooled FPGA drawers.

Preferably, FPGA chaining will be configured to minimize latency and/or maximize throughput (bandwidth) for data passed along the chain links between FPGAs and between FPGAs and the processor SoC host for the compute node. However, the importance of the latency/bandwidth consideration may be tempered if the amount of data that is passed is relatively small (given the available bandwidth of given links).

In conjunction with composing the compute node with the FPGA resources, the unified system FPGA view is updated to identify that the FPGA resources that are allocated for the compute node are currently in use and no longer available. As discussed above, this may be done by the POD Manager in one embodiment, or otherwise by another management entity.

In block 908, the FPGA chaining is effected, as applicable. For example, if only the FPGA resources on a compute node server or module are employed, there may be either no chaining or possible chaining between an embedded FPGA and an FPGA attached to a processor SoC via an IO link. For FPGAs that are chained either between compute node servers or modules within a pooled compute drawer, or between a compute node in a pooled compute drawer and an FPGA in a pooled FPGA drawer, the FPGA chaining may be effected either programmatically through configuration of applicable switch parameters, or may require a technician to install cables that directly link FPGAs. It is also noted that cabled configurations may be pre-installed. Configuration of the chaining may also involve configuration of communication interfaces between FPGAs, such as the FPGA IO ports and/or interfaces.

In a block 910, the FPGA(s) is/are programmed. In one embodiment, an FPGA is programmed by providing an FPGA bitstream to the FPGA over a secure channel. Generally, the secure channel may include a private network or an out-of-band channel. Encryption may or may not be used, depending on the particular requirements of the deployment. In alternative embodiments, an FPGA may be programmed by forwarding the FPGA bitstream to a PSME or a BMC. Under another approach, if the FPGA is local the FPGA bitstream is provided to an operating system over a secure channel, and the operating system is used to program the FPGA. In conjunction with programming FPGAs, the FPGA IO ports and/or interfaces may be configured to support chaining if not previously configured in block 908.

In a block 912, the programmed FPGAs are employed during on-going run-time operations. For chained FPGAs, this will involve forwarding data between FPGAs via the applicable chaining mechanism that are configured in block 908 and (optionally) block 910.

Generally, at some subsequent point in time, usage of the compute node will be completed. For example, under an Amazon AWS or EC2 model, the compute resources are leased for a period of time, under which the customer may choose to extend the lease or let the lease lapse. The customer may also request the lease be terminated. In response to termination or lapse of the lease, the compute node (along with its FGPA resources) is released, meaning the compute, memory, and FGPA resources allocated for the compute node are now available for use in a new composed compute node. Accordingly, when the compute node is released, the unified system FPGA view is updated to indicate the FPGA resources are available for allocation, as depicted in a block 914.

Another aspect of some embodiments, is exposing a unified view of the chained FPGAs in a composed compute node to a hypervisor or OS virtualization layer as a virtual monolithic FPGA, as depicted in a block 916. Optionally, the FPGAs may be presented individually as local FPGA resources, whether or not they are local or remote, or the FPGAs may be presented as a combination of a monolithic FPGA and one or more local FPGAs. Under either of these approaches, the mechanism(s) for implementing chaining of the FPGAs is transparent to the hypervisor or OS virtualization layer. Optionally, the hypervisor or OS virtualization layer may include logic for implementing software aspects of the FPGA chaining mechanism, while providing a view to a VM or container of a virtual monolithic FPGA or multiple individual local FPGAs. In other words, from the viewpoint of the VM or container, it has access to a virtual monolithic FPGA (built of chained FPGAs behind the scenes) or has access to multiple local FPGAs. It is further noted that the operation of block 916 may occur prior to programming one or more of the FPGAs in block 910, under which an operating system running on a VM or in a container is enabled to program the one or more FPGAs.

Figure 10A:
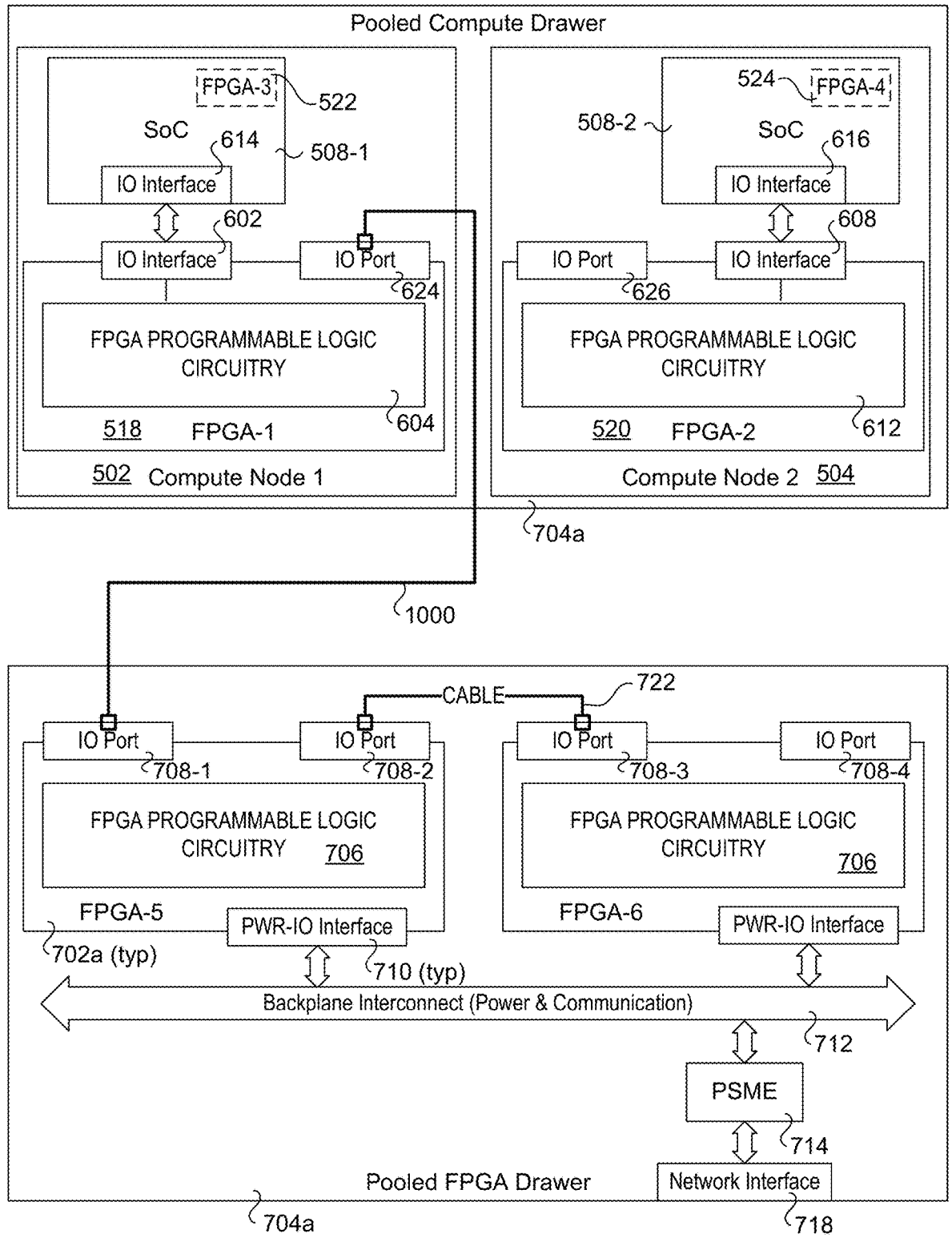
FIG. 10a is a schematic diagram of a system architecture under which a first FPGA in a pooled compute drawer includes an IO port that is linked to an IO port on a second FPGA in a pooled FPGA drawer via a cable, and further illustrating the second FPGA linked to a third FPGA in the pooled FPGA drawer via respective IO ports on the second and third FPGAs.
Figure 10B:
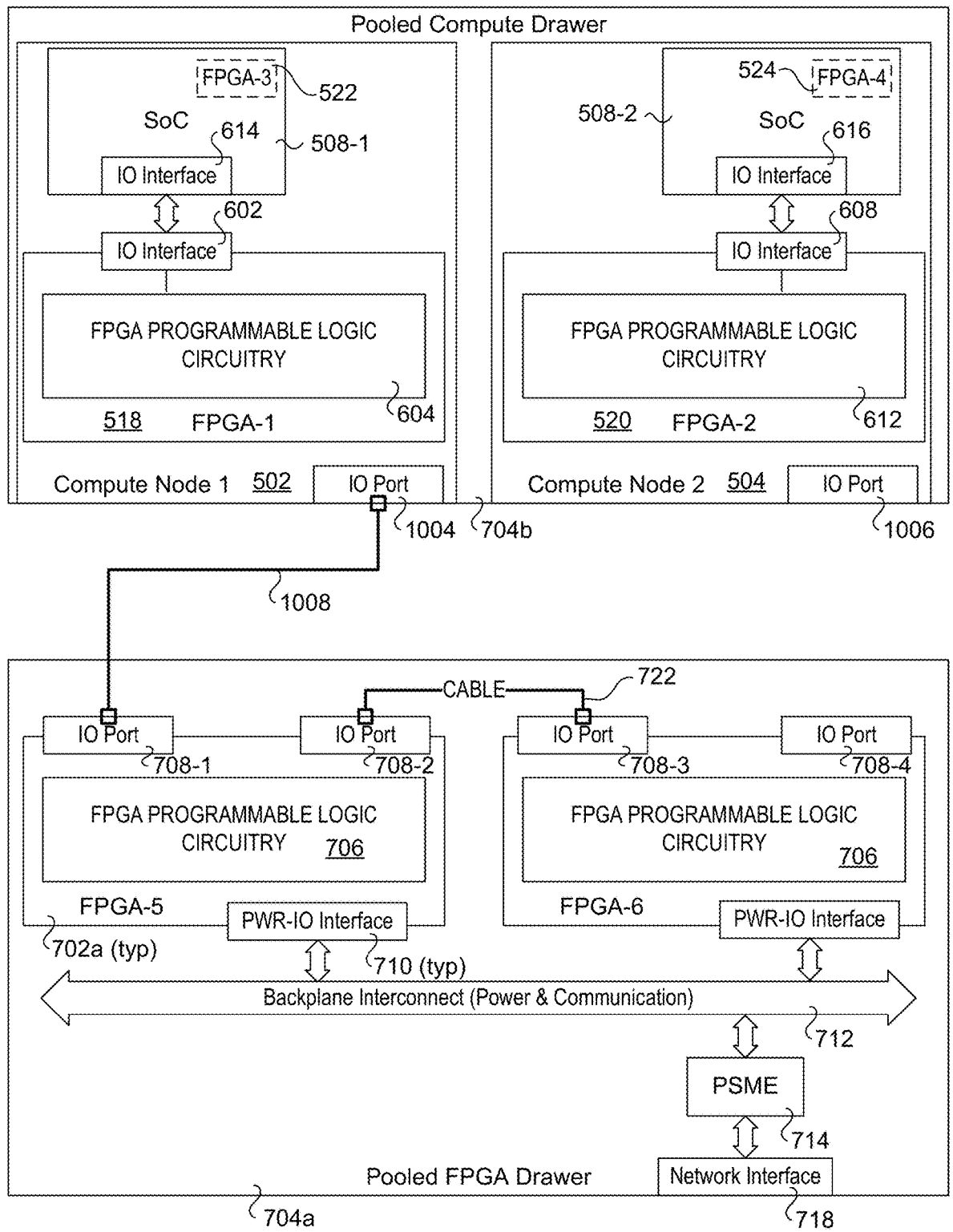
FIG. 10b is a schematic diagram of a system architecture under which a first FPGA is included in a compute node in a pooled compute drawer that includes an IO port that is linked to an IO port on a second FPGA in a pooled FPGA drawer via a cable, and further illustrating the second FPGA linked to a third FPGA in the pooled FPGA drawer via respective IO ports on the second and third FPGAs.

As discussed above, compute nodes and the compute, memory, and FGPA resources are composed by a management entity or the like, such as the POD Manager. Non-limiting examples of composed compute nodes are shown in FIGS. 5a, 10a, and 10b. FIG. 10a illustrates a first configuration under which FPGAs are chained using a cable 1000 that is coupled between IO port 624 on FPGA-1 and an IO port 708-1 on FPGA-5 in pooled compute drawer 704a. (Pooled compute drawer 704a in FIG. 10a is similar to pooled compute drawer 704a in FIG. 7a, except only two FPGAs 702 are shown.) This embodiment provides a direct cable connection between FPGA-1 and FPGA-5. As further shown, an IO port 708-2 on FPGA-5 is coupled to an IO port 708-3 in FPGA-6 via a cable 722, thus linking FPGA-5 in communication with FPGA-6.

After cables 1000 and 722 are installed, operations for effecting the chaining of FPGA-1 to FPGA-2 to FPGA-3 are performed. As discussed above, the result of the FPGA chaining may form a virtual monolithic FPGA or may make the FPGAs appear as local FPGAs to the hypervisor or OS virtualization layers. Respective examples of the unified FPGA views presented to the hypervisor or OS virtualization layer are shown in FIGS. 11a and 11b.

Figure 11A:
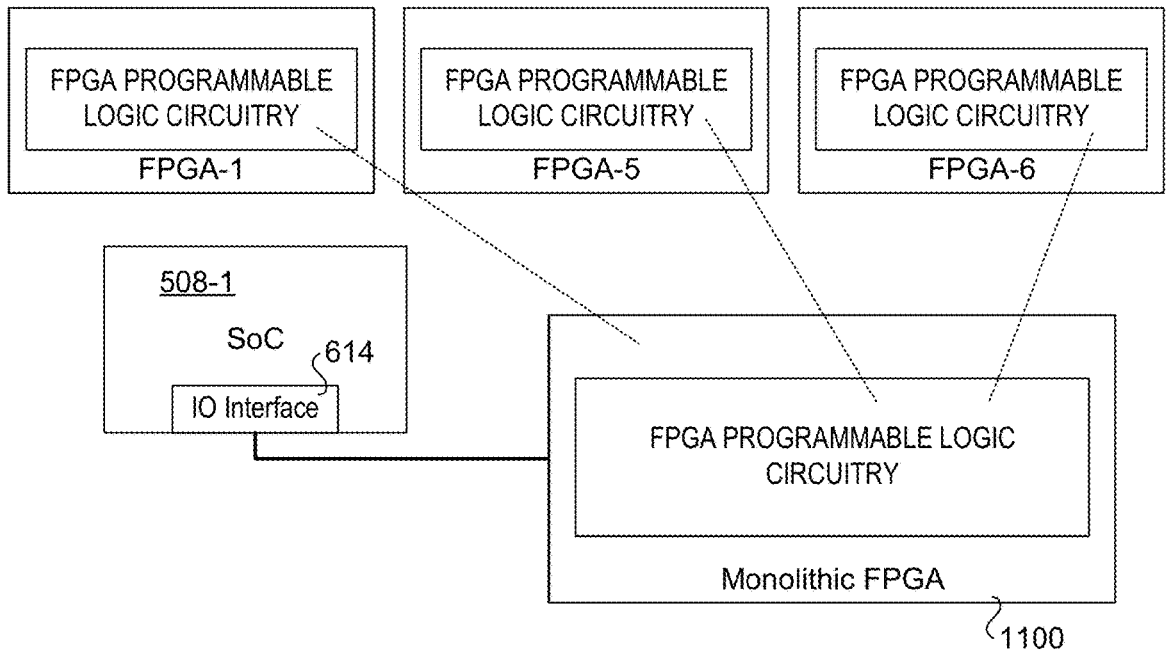
FIG. 11a is a block diagram illustrating the FPGA programmable logic circuitry of chained FPGAs being combined to create a virtual monolithic FPGA that is exposed to a hypervisor or OS virtualization layer hosted by a compute node.

As illustrated in FIG. 11a, the FPGA programmable logic circuitry of FPGA resources of FPGA-1, FPGA-5, and FPGA-6 are aggregated into a virtual monolithic FPGA 1100 that is coupled to IO interface 614 on SoC 508-1 via a virtual link 1102. For example, suppose FPGA-1 has 500 million gates (0.5 G), and each of FPGA-5 and FPGA-6 has 1 billion gates (1 G). The virtual monolithic FPGA would then have 2.5 billion gates, which is an aggregation of the gates for the individual FPGAs 1, 5, and 6.

Figure 11B:
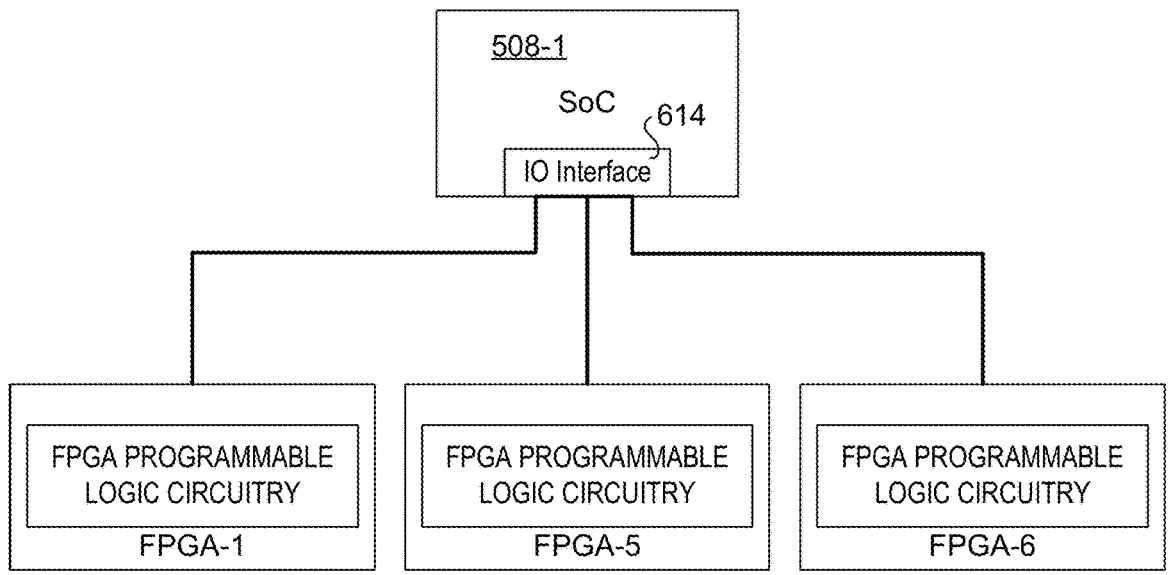
FIG. 11b is a block diagram illustrating each of multiple FPGAs in an FPGA chain being exposed to the hypervisor or OS virtualization layer as local FPGAs.

As illustrated in FIG. 11b, each of FPGA-1, FPGA-5, and FPGA-6 appears to be coupled to IO interface 614 (or separate IO interfaces, not shown) on SoC 508-1. Thus, from the viewpoint of the hypervisor or OS virtualization layer, the FPGA resources include three local FPGAs.

FIG. 10b illustrates an alternative cabling configuration to that shown in FIG. 10a. Under the configuration of FIG. 10b, compute node 502 further includes an IO port 1004 and compute node 504 further includes an IO port 1006, as shown in a pooled computer drawer 704b. (Each of IO ports 1004 and 1006 would be coupled to an IO interface on its respective processor SoC 508-1 and 508-2 that is not shown, but would be understood by those skilled in the art to be present.) Meanwhile, the IO ports 624 and 626 on FPGAs 518 and 520 have been removed. As further illustrated, a cable 1008 is coupled between IO port 1004 on compute node 502 and IO port 708-1 on FPGA-5.

In addition to linking FPGAs via cable links, FPGAs may be virtually linked over a fabric. An example of linking FPGAs 1, 5, and 6 over a fabric 538 is shown in FIG. 5a. In this case, the link from FPGA-1 to FPGA-5 would flow from FPGA-1 over a link 554 to a first IO interface (not shown) on processor SoC 508-1 to a second IO interface (not shown) on processor SoC 508-1 over a link 556 to NIC 512 over fabric 538 to fabric interface 546 to interconnect 542 to FPGA-5. FPGA-5 is then chained to FPGA-6 via interconnect 542. This is similar to the chaining mechanism illustrated in configuration 700c of FIG. 7c discussed above.

The unified views presented to the hypervisor or OS virtualization layer under the embodiments of FIGS. 5a and 10b will be similar to those shown in FIGS. 11a and 11b. From the perspective of the hypervisor or OS virtualization layer, the mechanisms used to chain FPGAs 1, 5, and 6 are hidden. Thus, even though the embodiments of FIGS. 5a, 10a and 10b use different chaining mechanisms to chain FPGAs 1, 5 and 6, from the perspective of the hypervisor or OS virtualization layer the unified views of the FPGA configurations that are presented to them are similar.

Figure 12:
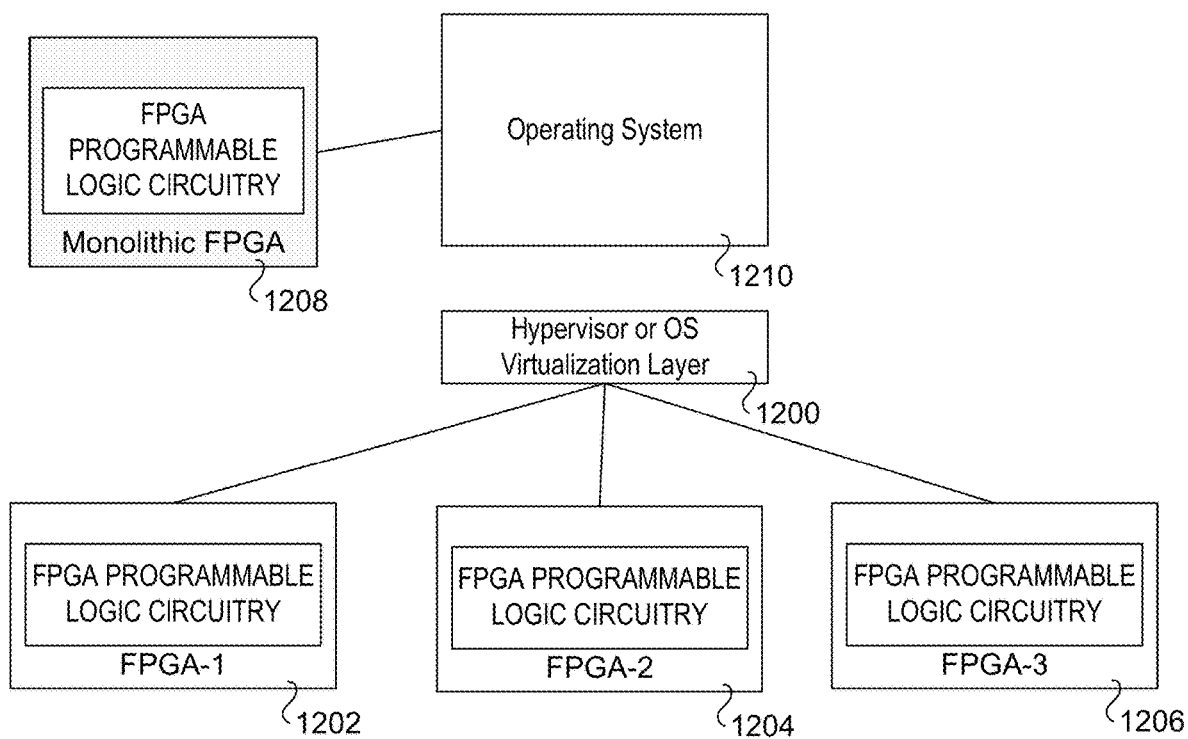
FIG. 12 is a block diagram illustrating the use of a hypervisor or OS virtualization layer exposing multiple chained FPGAs as a monolithic FPGA to an operating system, according to one embodiment.

FIG. 12 illustrates the use of a hypervisor or OS virtualization layer 1200 exposing multiple FPGAs 1202, 1204, and 1206 as a monolithic FPGA 1208 to an operating system 1210. Under this approach, the hypervisor or OS virtualization layer interfaces with the underlying platform hardware, including the FPGA resources, to abstract the physical configuration of the FPGA resources, presenting the FPGA resources as a monolithic FPGA to the operating system.

Figure 13:
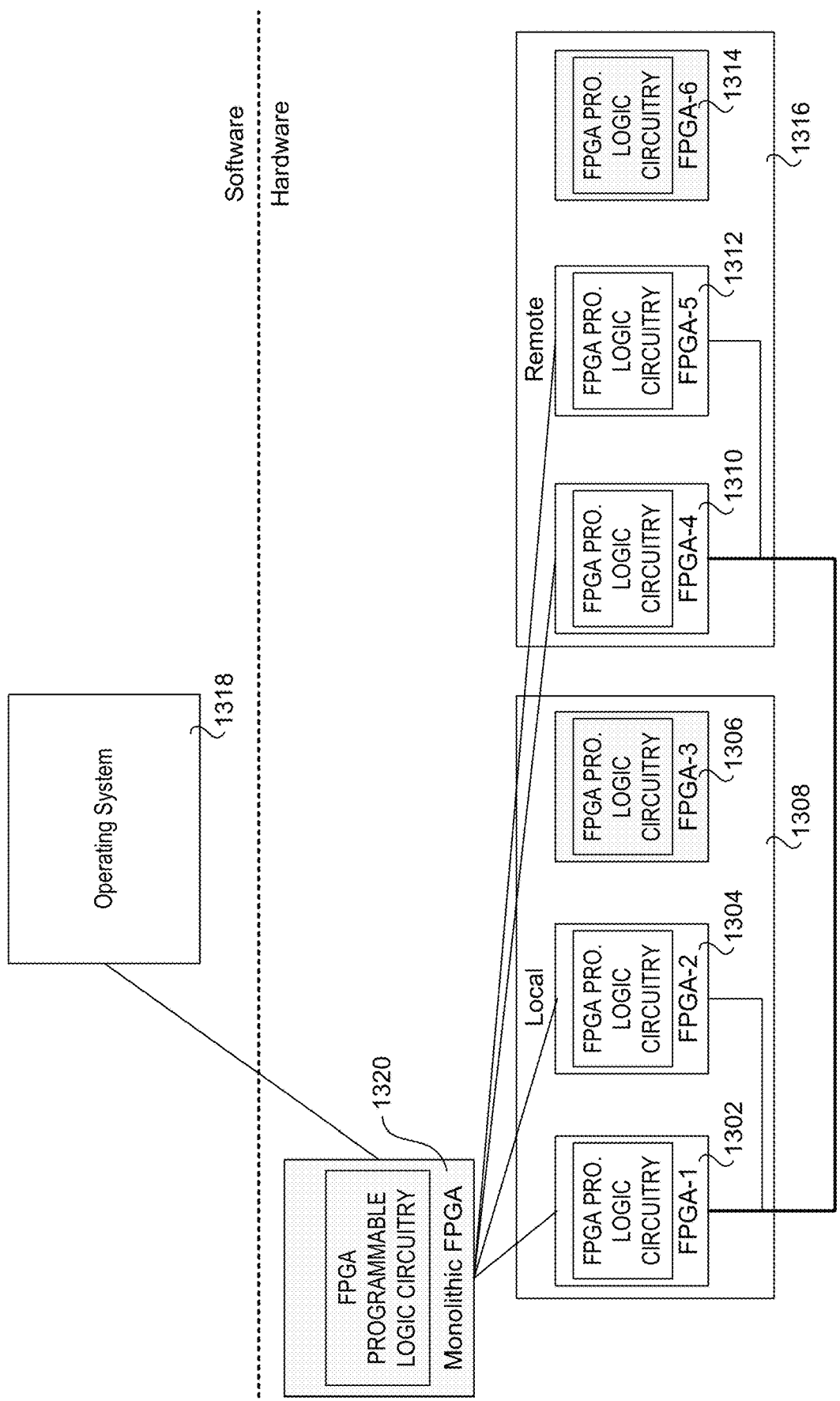
FIG. 13 is a block diagram illustrating an approach under which the platform hardware is used to present FGPA resources to an operating system that are abstracted from the physical FPGA resources, according to one embodiment.

FIG. 13 illustrates another approach under which the platform hardware is used to present FGPA resources to an operating system that are abstracted from the physical FPGA resources. As shown in FIG. 13, the physical FPGA resources including FPGAs 1302, 1304, and 1306 in a local node 1308, and FPGAs 1310, 1312, and 1314 in a remote node 1316. FPGAs 1302, 1304, 1310, and 1312 are chained, which the combination of the programmable logic circuitry of these FPGAs presented to an operating system 1318 running on the local node as a monolithic FPGA 1320. Meanwhile, each of FGPA 1306 and 1314 are presented to operating system 1318 is local FPGA resources. Also a single monolithic FPGA is shown in FIG. 13, it is possible for multiple groups of chained FGPAs to be implemented and presented as separate monolithic FPGAs.

Further aspects of the subject matter described herein are set out in the following numbered clauses:

1. A computer-implemented method, comprising:
linking a plurality of Field Programmable Gate Arrays (FPGA) in communication to form a chain of FPGAs, the plurality of FPGAs including an FPGA that is coupled to a processor in a compute node, each of the plurality of FPGAs having respective a size; and
exposing the chain of FPGAs to a to a hypervisor, an operating system virtualization layer, or to an operating system hosted by the compute node as a virtual monolithic FPGA have a size that is an aggregate of the individual sizes of the FPGAs in the chain of FPGAs.

2. The method of clause 1, wherein the chain of FPGAs includes a chaining mechanism that couples a first FPGA in a first compute node in communication with a second FPGA in a second compute node.

3. The method of clause 2, wherein the chaining mechanism comprise a cable coupled to respective ports on the first and second FPGAs.

4. The method of clause 2 or 3, wherein the first and second compute nodes are installed in the same pooled compute drawer.

5. The method of clause 3, wherein the first and second compute nodes are coupled to a backplane in the pooled compute drawer and the chaining mechanism linking the first FPGA in communication with the second FPGA includes wiring in the backplane.

6. The method of clause 3, wherein the pooled compute drawer includes backplane wiring and each of the first FPGA and second FPGA is coupled to the backplane wiring.

7. The method of any of clauses 2-6, wherein the chain of FPGAs include a first FPGA installed in a first pooled system drawer linked in communication with a second FPGA installed in a second pooled system.

8. The method of clause 7, wherein the first and second pooled compute drawers are linked in communication via a fabric, and wherein the chaining mechanism coupling the first FPGA in communication with the second FPGA traverses the fabric.

9. The method of any of the preceding clauses, wherein the chain of FPGAs includes a first FPGA in a first pooled system drawer linked in communication with a second FPGA in a second pooled system drawer that is linked in communication with a third FPGA in the second pooled system drawer.

10. The method of clause 9, wherein the second and third FPGA are linked in communication via a cable.

11. The method of clause 9, wherein the second pooled system drawer includes a backplane to which each of the first and second FPGAs are communicatively coupled, and wherein a portion of wiring in the backplane is used to carry signals to facilitate communication between the second and third FPGAs.

12. A method implemented by components in a plurality of pooled system drawers installed in a rack, the pooled system drawers including one or more pooled compute drawers and one or more pooled Field Programmable Gate Array (FPGA) drawers, comprising:

for each of the one or more pooled compute drawers installed in a rack, enumerating Field Programmable Gate Array (FPGA) devices that are associated with compute nodes installed in the pooled compute drawer;

for each of the one or more pooled FPGA drawers installed in a rack, enumerating FPGAs installed in the pooled FPGA drawer;

identifying chainable FPGAs among the FPGAs that are enumerated associated with the compute nodes installed in the one or more pooled compute drawers and the FPGAs that are enumerated for the one or more pooled FPGA drawers;

identifying intra-drawer FPGA chaining mechanisms for chaining chainable FPGAs within the one or more pooled compute drawers and the one or more pooled FPGA drawers; and identifying inter-drawer FPGA chaining mechanisms for chaining chainable FPGAs located in separate pooled system drawers; and composing a unified view of the FPGAs for the rack, the unified view identifying a location and at least one of a size and type of each FPGA, whether the FPGA is a chainable FPGA, and a chaining mechanism for each chainable FPGA.

13. The method of clause 12, further comprising:

composing a compute node that is enabled to access a plurality of FPGAs that are allocated for the compute node, at least two of the plurality of FPGAs being linked in communication to form a chain of FPGAs; and updating the unified view of the FPGAs to indicate the plurality of FPGAs are allocated to the compute node.

14. The method of clause 13, wherein the chain of FPGAs includes a chaining mechanism that links a first FPGA in a first compute node in communication with a second FPGA in a second compute node.

15. The method of clause 14, wherein the chaining mechanism comprise a cable coupled to respective ports on the first and second FPGAs.

16. The method of clause 14, wherein the first and second compute nodes are installed in the same pooled compute drawer.

17. The method of clause 16, wherein the first and second compute nodes are coupled to a backplane in the pooled compute drawer and the chaining mechanism that links the first FPGA in communication with the second FPGA includes wiring in the backplane.

18. The method of clause 16, wherein the pooled compute drawer includes backplane wiring and each of the first FPGA and second FPGA is coupled to the backplane wiring.

19. The method of any of clauses 14-18, wherein the chain of FPGAs include first FPGA installed in a first pooled system drawer linked in communication with a second FPGA installed in a second pooled system.

20. The method of clause 19, wherein the first and second pooled system drawers are linked in communication via a fabric, and wherein the chaining mechanism linking the first FPGA in communication with the second FPGA traverses the fabric.

21. The method of any of clauses 13-20, wherein the chain of FPGAs includes a first FPGA in a first pooled system drawer linked in communication with a second FPGA in a second pooled system drawer that is linked in communication with a third FPGA in the second pooled system drawer.

22. The method of clause 21, wherein the second and third FPGA are linked in communication via a cable.

23. The method of clause 21, wherein the second pooled system drawer includes a backplane to which each of the first and second FPGAs are communicatively coupled, and wherein a portion of wiring in the backplane is used to carry signals to facilitate communication between the second and third FPGAs.

24. The method of any of clauses 13-23, further comprising:

receiving a request from a customer to be allocated compute resources including FPGA resources for use by the customer;

composing a compute node including a plurality of FPGAs to service the request, at least two of the plurality of FPGAs being chained to form a chain of FPGAs; and enabling the customer to use the compute node that is composed.

25. A pooled compute drawer, configured to be installed in a rack, comprising:

a plurality of compute nodes, each compute node including, a processor;

memory, operatively coupled to the processor; and a Field Programmable Gate Array (FPGA) device, operatively coupled to the processor;

the pooled compute drawer further including one or more chaining mechanisms for linking FPGAs included in respective compute nodes in communication to form an FPGA chain.

26. The pooled compute drawer of clause 25, wherein a first compute node includes a first FPGA having a first port and a second compute node includes a second FPGA having a second port, and wherein a chaining mechanism comprises a cable coupled to the first and second ports on the first and second FPGAs.

27. The pooled compute drawer of clause 26, further comprising a backplane, wherein each of a first compute node including a first FPGA and a second compute node including a second FPGA is coupled to the backplane and a chaining mechanism that links the first FPGA in communication with the second FPGA includes wiring in the backplane.

28. The pooled compute drawer of clause 26, further comprising a backplane including backplane wiring, wherein the pooled compute drawer includes a first compute node including a first FPGA and a second compute drawer including a second FPGA, and wherein each of the first FPGA and second FPGA are communicatively coupled to a portion of the backplane wiring, linking the first FPGA in communication with the second FPGA.

29. The pooled compute drawer of any of clauses 25-28, wherein a software application is executed on a first processor of a first compute node including a first FPGA that is chained to a second FPGA coupled to a second processor in a second compute node, and wherein the software application is enabled to assess both the first and second FPGAs to perform workload tasks.

30. The pooled compute drawer of any of clauses 25-29, wherein a hypervisor is executed on a first processor of a first compute node including a first FPGA that is chained to a second FPGA coupled to a second processor in a second compute node to form chained FPGAs that are exposed to the hypervisor as a virtual monolithic FPGA or multiple local FPGAs.

31. The pooled compute drawer of any of clauses 25-29, wherein an operating system virtualization layer is executed on a first processor of a first compute node including a first FPGA that is chained to a second FPGA coupled to a second processor in a second compute node to form chained FPGAs that are exposed to the operating system virtualization layer as a virtual monolithic FPGA or multiple local FPGAs.

32. A pooled Field Programmable Gate Array (FPGA) drawer, configured to be installed in a rack, comprising:
a backplane interconnect, including wiring to carry power and input-output (IO) signals;
a plurality of FPGAs, each coupled to the backplane interconnect via a power and IO interface; and
means for chaining at least two of the FPGAs together to form an FPGA chain.

33. The pooled FPGA drawer of clause 32, wherein each of first and second FPGAs include at least one IO port, and a first cable is coupled between an IO port on the first FPGA and an IO port on the second FPGA.

34. The pooled FPGA drawer of clause 33, wherein a third FPGA includes at least one IO port, and the second FPGA includes a first IO port coupled to an IO port on the first FPGA via the first cable and a second IO port coupled to an IO port on the third FPGA via a second cable.

35. The pooled FPGA drawer of clause 33, wherein each of first FPGA includes a first IO port configured to be coupled to a first end of a second cable having a second end configured to be coupled to a compute node in a compute drawer and a second IO port that is coupled to an IO port on the second FPGA via the first cable.

36. The pooled compute drawer of any of clauses 32-35, further comprising:
a network interface; and
a drawer management component, coupled between the network interface and the backplane interconnect,
wherein the drawer management component is configured to receive FPGA configuration information sent to the pooled FPGA drawer over a network to which the network interface is coupled and configure the plurality of FPGAs.

37. The pooled FPGA drawer of clause 32, further comprising a switch having a plurality of switch ports, wherein each of the plurality of FPGAs includes means for coupling the FPGA to a respective switch port on the switch.

38. The pooled FPGA drawer of clause 37, wherein each FPGA includes a data port that is coupled to a respective switch port in the switch.

39. The pooled FPGA drawer of clause 38, at least one of the plurality of FPGAs includes an IO port configured to be coupled to a compute node in a pooled compute drawer via a cable.

40. The pooled FPGA drawer of clause 37, further comprising a fabric interface that is communicatively coupled to the switch.

41. The pooled compute drawer of any of clauses 37-40, further comprising:
a network interface; and
a drawer management component, coupled between the network interface and the backplane interconnect and coupled to the switch,
wherein the drawer management component is configured to receive FPGA configuration information sent to the pooled FPGA drawer over a network to which the network interface is coupled and configure the plurality of FPGAs and to configure the switch.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including one or more computer-readable or machine-readable non-transitory storage mediums, which provides content that represents instructions that can be executed. In one embodiment, the instructions are configured to be executed in a distributed manner on multiple distributed processing elements in the rack to perform various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A computer-implemented method, comprising:
   linking a plurality of Field Programmable Gate Arrays (FPGA) in communication to form a chain of FPGAs, the plurality of FPGAs including an FPGA that is coupled to a processor in a compute node, each of the plurality of FPGAs having a respective size; and
   exposing the chain of FPGAs to a hypervisor, an operating system virtualization layer, or to an operating system hosted by the compute node as a virtual monolithic FPGA having a size that is an aggregate of the individual sizes of the FPGAs in the chain of FPGAs.

2. The method of claim 1, wherein the chain of FPGAs includes a chaining mechanism that couples a first FPGA in a first compute node in communication with a second FPGA in a second compute node.

3. The method of claim 2, wherein the chaining mechanism comprise a cable coupled to respective ports on the first and second FPGAs.

4. The method of claim 2, wherein the first and second compute nodes are installed in the same pooled compute drawer.

5. The method of claim 3, wherein the first and second compute nodes are coupled to a backplane in the pooled compute drawer and the chaining mechanism linking the first FPGA in communication with the second FPGA includes wiring in the backplane.

6. The method of claim 3, wherein the pooled compute drawer includes backplane wiring and each of the first FPGA and second FPGA is coupled to the backplane wiring.

7. The method of claim 2, wherein the chain of FPGAs include a first FPGA installed in a first pooled system drawer linked in communication with a second FPGA installed in a second pooled system.

8. The method of claim 7, wherein the first and second pooled compute drawers are linked in communication via a fabric, and wherein the chaining mechanism coupling the first FPGA in communication with the second FPGA traverses the fabric.

9. The method of claim 1, wherein the chain of FPGAs includes a first FPGA in a first pooled system drawer linked in communication with a second FPGA in a second pooled system drawer that is linked in communication with a third FPGA in the second pooled system drawer.

10. The method of claim 9, wherein the second and third FPGA are linked in communication via a cable.

11. The method of claim 9, wherein the second pooled system drawer includes a backplane to which each of the first and second FPGAs are communicatively coupled, and wherein a portion of wiring in the backplane is used to carry signals to facilitate communication between the second and third FPGAs.

12. A pooled compute drawer, configured to be installed in a rack, comprising:
   a plurality of compute nodes, each compute node including,
      a processor;
      memory, operatively coupled to the processor; and
      a Field Programmable Gate Array (FPGA), operatively coupled to the processor;
   one or more chaining mechanisms for linking FPGAs included in respective compute nodes in communication to form an FPGA chain; and
   a management component configured to allocate FPGA resources to the plurality of compute nodes such that at least one compute node is allocated multiple FPGAs comprising an FPGA chain linking an FPGA from that compute node and an FPGA from at least one other compute node.

13. The pooled compute drawer of claim 12, wherein the management component is configured to receive FPGA resource allocation information sent to the compute drawer and allocate FPGA resources and configure FPGA chaining mechanisms in the pooled compute drawer based on the FPGA resource allocation information.

14. The pooled compute drawer of claim 12, wherein a first compute node includes a first FPGA having a first port and a second compute node includes a second FPGA having a second port, and wherein a chaining mechanism comprises a cable coupled to the first and second ports on the first and second FPGAs.

15. The pooled compute drawer of claim 14, further comprising a backplane, wherein each of a first compute node including a first FPGA and a second compute node including a second FPGA is coupled to the backplane and a chaining mechanism that links the first FPGA in communication with the second FPGA includes wiring in the backplane.

16. The pooled compute drawer of claim 12, further comprising a backplane including backplane wiring, wherein the pooled compute drawer includes a first compute node including a first FPGA and a second compute drawer including a second FPGA, and wherein each of the first FPGA and second FPGA are communicatively coupled to a portion of the backplane wiring, linking the first FPGA in communication with the second FPGA.

17. A pooled Field Programmable Gate Array (FPGA) drawer, configured to be installed in a rack, comprising:
    a backplane interconnect, including wiring to carry power and input-output (IO) signals;
    a plurality of FPGAs, each coupled to the backplane interconnect via a power and IO interface;
    means for chaining at least two of the FPGAs together to form an FPGA chain;
    a network interface; and
    a drawer management component, coupled between the network interface and the backplane interconnect,
    wherein the drawer management component is configured to receive FPGA configuration information sent to the pooled FPGA drawer over a network to which the network interface is coupled and configure the plurality of FPGAs such that at least two FPGAs are chained.

18. The pooled FPGA drawer of claim 17, wherein each of first and second FPGAs include at least one IO port, and a first cable is coupled between an IO port on the first FPGA and an IO port on the second FPGA.

19. The pooled FPGA drawer of claim 17, further comprising a switch having a plurality of switch ports, wherein each of the plurality of FPGAs includes means for coupling the FPGA to a respective switch port on the switch.

20. The pooled FPGA drawer of claim 19, further comprising a fabric interface that is communicatively coupled to the switch.

* * * * *